US009221649B2

(12) United States Patent
Tanaka

(10) Patent No.: US 9,221,649 B2
(45) Date of Patent: *Dec. 29, 2015

(54) ADHESIVE TAPE CARTRIDGE

(71) Applicant: BROTHER KOGYO KABUSHIKI KAISHA, Nagoya-shi, Aichi (JP)

(72) Inventor: Mitsugi Tanaka, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 10 days.

This patent is subject to a terminal disclaimer.

(21) Appl. No.: 13/875,380

(22) Filed: May 2, 2013

(65) Prior Publication Data

US 2013/0292061 A1 Nov. 7, 2013

(30) Foreign Application Priority Data

May 2, 2012 (JP) ................................ 2012-105350

(51) Int. Cl.
*B29C 65/00* (2006.01)
*B65H 37/00* (2006.01)
(Continued)

(52) U.S. Cl.
CPC ............... *B65H 49/00* (2013.01); *B41J 15/044* (2013.01); *B41J 15/046* (2013.01); *B65C 9/00* (2013.01);
(Continued)

(58) Field of Classification Search
CPC .. B65H 49/00; B65H 35/0026; B65H 37/002; B65H 2301/5111; B65H 2301/1849; B65H 35/00; B65H 37/02; B65H 37/005; B65H 75/14; B41J 3/407; B41J 15/04; B65C 9/00; B65C 9/0006; B65C 2009/0009; B65C 2009/0087; B65C 2009/0096; B65C 9/18; B65C 9/1865; B65C 9/1869; B65C 2201/00; B65C 11/004
USPC ......... 156/527, 523, 577, 579, 574, 576, 486, 156/510; 225/19, 20
See application file for complete search history.

(56) References Cited

U.S. PATENT DOCUMENTS 2,276,297 A * 3/1942 Flood ............................ 156/701
3,151,724 A * 10/1964 Ross ........................ B41J 32/00
400/208.1

(Continued)

FOREIGN PATENT DOCUMENTS

CN 101934648 1/2011
EP 0 917 959 5/1999

(Continued)

OTHER PUBLICATIONS

European Search Report issued in Application No. 13166241.3 on Aug. 12, 2013.

(Continued)

*Primary Examiner* — Alex Efta
(74) *Attorney, Agent, or Firm* — McCarter & English, LLP

(57) ABSTRACT

The disclosure discloses an adhesive tape cartridge. The adhesive tape cartridge includes an adhesive tape roll around which an adhesive tape is wound about an axis line, a separation material roll configured to wind the separation material layer around an axis line, a connecting arm that freely rotatably supports the adhesive tape roll and freely rotatably supports the separation material roll, and a guide device configured to cause the adhesive tape to pass in a tape posture with a tape cross-section set to a substantially horizontal direction, substantially contact both tape width direction ends during the passing, and to guide the adhesive tape in the tape width direction, provided in a middle part of the connecting arm, between the adhesive tape roll and the separation material roll.

6 Claims, 25 Drawing Sheets

(51) Int. Cl.

| | |
|---|---|
| ***B65C 9/18*** | (2006.01) |
| ***B65H 49/00*** | (2006.01) |
| ***B65H 35/00*** | (2006.01) |
| ***B65H 37/02*** | (2006.01) |
| ***B65C 9/00*** | (2006.01) |
| ***B41J 15/04*** | (2006.01) |
| *B65H 75/14* | (2006.01) |
| *B65C 11/00* | (2006.01) |

(52) U.S. Cl.
CPC ................. *B65C 9/18* (2013.01); *B65C 9/1865* (2013.01); *B65H 35/00* (2013.01); *B65H 35/002* (2013.01); *B65H 37/005* (2013.01); *B65H 37/02* (2013.01); *B65C 9/0006* (2013.01); *B65C 9/1869* (2013.01); *B65C 11/00* (2013.01); *B65C 11/004* (2013.01); *B65C 2009/0009* (2013.01); *B65C 2009/0087* (2013.01); *B65C 2009/0096* (2013.01); *B65C 2201/00* (2013.01); *B65H 75/14* (2013.01); *Y10T 156/17* (2015.01)

(56) References Cited

U.S. PATENT DOCUMENTS 4,294,644 A 10/1981 Anderson
4,954,210 A * 9/1990 Desmond .............. B65C 9/1892 156/719
5,588,756 A * 12/1996 Hamisch, Jr. .............. B41J 3/36 400/208
6,132,119 A * 10/2000 Nakajima .............. B41J 3/4075 400/207
6,179,030 B1 * 1/2001 Rietheimer ................... 156/360
6,868,889 B2 * 3/2005 Kvamme ................ B32B 37/10 156/510
2002/0003549 A1 1/2002 Mitsuhashi
2006/0239743 A1 * 10/2006 Naito ....................... B41J 17/32 400/208
2010/0329767 A1 12/2010 Sago
2013/0186570 A1 * 7/2013 Doniger ............... B65H 37/005 156/577
2013/0292060 A1 * 11/2013 Tanaka .......................... 156/538

FOREIGN PATENT DOCUMENTS

JP 58166091 10/1983
JP 0577824 3/1993
JP 10193651 7/1998
JP 20000247502 9/2000
JP 2002006701 1/2002
JP 2006103078 4/2006
JP 2006159413 6/2006
JP 2006328118 12/2006
JP 2009214433 9/2009
JP 201099886 5/2010
WO 2010125127 11/2010

OTHER PUBLICATIONS

Chinese Office Action issued in Application No. 201310157906.x on Jan. 22, 2015.

* cited by examiner

FIG. 21A COMPARISON EXAMPLE
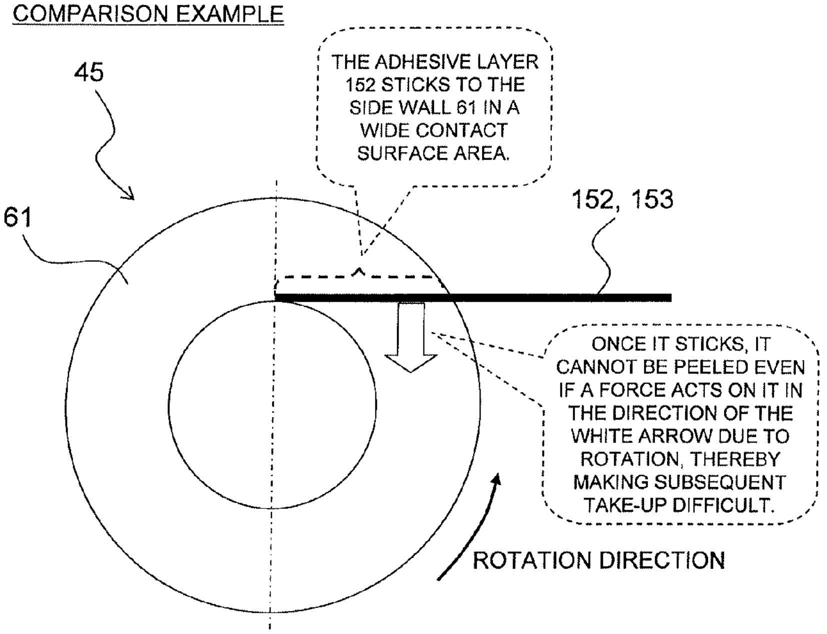
FIG. 21B EMBODIMENT
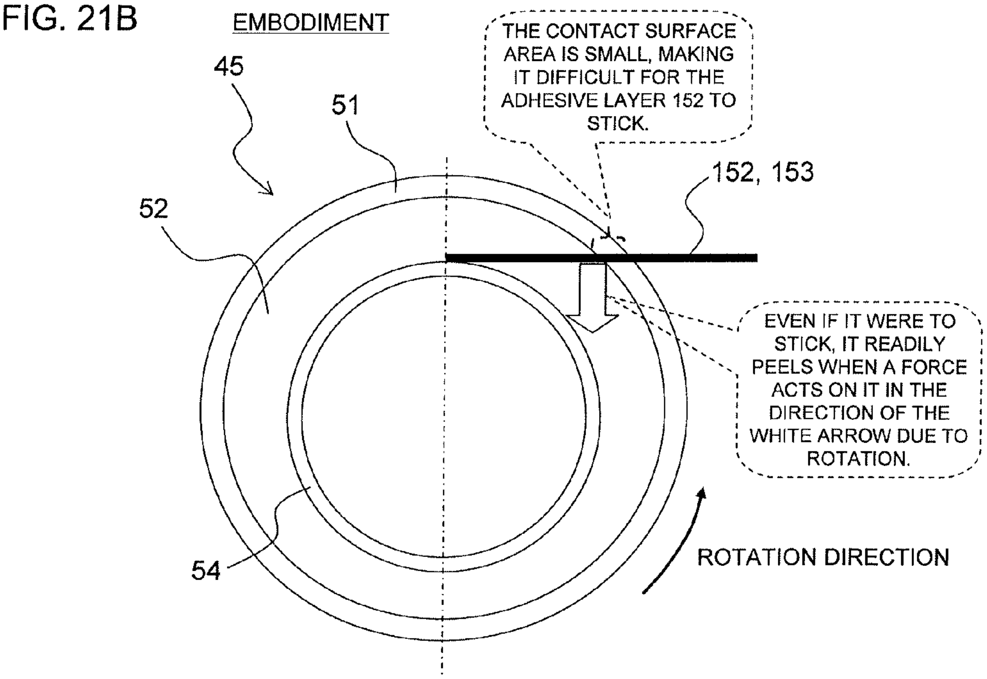

ADHESIVE TAPE CARTRIDGE

CROSS-REFERENCE TO RELATED APPLICATION

The present application claims priority from Japanese Patent Application No. 2012-105350, which was filed on May 2, 2012, the disclosure of which is incorporated herein by reference in its entirety.

BACKGROUND

1. Field

The present disclosure relates to an adhesive tape cartridge capable of supplying an adhesive tape comprising an adhesive layer and a separation material layer.

2. Description of the Related Art

Tape printing devices that perform printing while feeding an adhesive tape (tag tape) comprising an adhesive layer and a separation material layer are already known. According to the tape printing device (tag label producing apparatus) of this prior art, the adhesive tape cartridge (tag tape roll body) is mounted to and used in a tape holder storage part. An adhesive tape roll, around which the adhesive tape is wound about an axis line in the substantially horizontal direction, is rotatably provided to the adhesive tape cartridge. Then, when the adhesive tape cartridge is mounted to the tape holder storage part, the adhesive tape is fed out and fed by the rotation of the adhesive tape roll. Preferred print is formed on the fed adhesive tape, generating an adhesive tape with print. At the time of use, the separation material layer is peeled from the generated adhesive tape with print by the user. Then, utilizing the adhesive force of the adhesive layer exposed by the peeling of the separation material layer, the adhesive tape with print is affixed to a suitable object to be affixed intended by the user.

From the viewpoint of improving the handling performance by the user, in a case where the separation material layer is to be peeled from the adhesive tape at the time of use as described above, conceivably the peeled separation material layer can also be formed into a roll similar to the adhesive tape, and these two rolls (the adhesive tape roll and the separation material roll) can be incorporated as a single cartridge. Nevertheless, with these two rolls just simply incorporated inside a cartridge, the feeding until the peeling of the separation material after feed-out from the adhesive tape roll as previously described (in other words, the feeding between the two rolls) is unstable, making it difficult to achieve smooth tape feeding.

SUMMARY

It is therefore an object of the present disclosure to provide an adhesive tape cartridge that is capable of improving the handling performance of the adhesive tape roll and separation material roll by the user and achieving smooth tape feeding.

In order to achieve the above-described object, according to the aspect of the present application, there is provided an adhesive tape cartridge. The adhesive tape cartridge includes an adhesive tape roll around which an adhesive tape, which comprises an adhesive layer and a separation material layer that covers the adhesive layer, is wound about an axis line in the substantially horizontal direction, a separation material roll configured to wind the separation material layer around an axis line in the substantially horizontal direction, the separation material layer being peeled from the adhesive tape fed out from the adhesive tape roll and fed, a connecting arm that freely rotatably supports the adhesive tape roll on one side in the horizontal direction and freely rotatably supports the separation material roll on the other side in the horizontal direction, provided so as to connect the adhesive tape roll and the separation material roll, and a guide device configured to cause the adhesive tape fed from the adhesive tape roll to pass in a tape posture with a tape cross-section set to a substantially horizontal direction, substantially contact both tape width direction ends during the passing, and to guide the adhesive tape in the tape width direction, provided in a middle part of the connecting arm, between the adhesive tape roll and the separation material roll along a feeding path of the adhesive tape.

The adhesive tape cartridge of the present disclosure comprises an adhesive tape roll around which is wound an adhesive tape comprising an adhesive layer and separation material layer, a separation material roll around which is wound the separation material layer, and a connecting arm that freely rotatably supports these two rolls. After the adhesive tape fed out by the rotation of the adhesive tape roll is fed, the separation material layer is peeled, and the peeled separation material layer is wound to form the separation material roll.

According to the present disclosure, in a case where the separation material layer is thus peeled from the adhesive tape and used, the adhesive tape roll around which is wound the adhesive tape and the separation material roll around which is wound the peeled separation material layer are integrated via a connecting arm. With this arrangement, the user can simply perform various handling collectively, such as attach and detach these two rolls to and from the tape printing device side, making it possible to improve convenience.

Further, as previously described, the adhesive tape fed out from the adhesive tape roll positioned on one side in the horizontal direction is fed to the other side in the horizontal direction to the position where the peeling is performed, and then the peeling is executed. According to the present disclosure, in a configuration where the adhesive tape roll and separation material roll are integrated by a connecting arm as described above, a guide device is provided to the connecting arm to ensure that the tape feeding such as described above is performed smoothly. The guide device substantially contacts both tape width direction ends and guides the adhesive tape while causing the adhesive tape to pass with the tape transverse cross-section set to the substantially horizontal direction. With this arrangement, it is possible to reliably achieve smooth tape feeding.

Thus, according to the present disclosure, it is possible to improve the handling performance by the user and ensure smooth feeding.

BRIEF DESCRIPTION OF THE DRAWINGS

FIG. 21A is an explanatory view explaining the tape adhering behavior of a comparison example with respect to the other example of the core member.

FIG. 21B is an explanatory view explaining the tape adhering behavior of the other example of the core member.

DETAILED DESCRIPTION OF THE PREFERRED EMBODIMENTS

Figure 1:
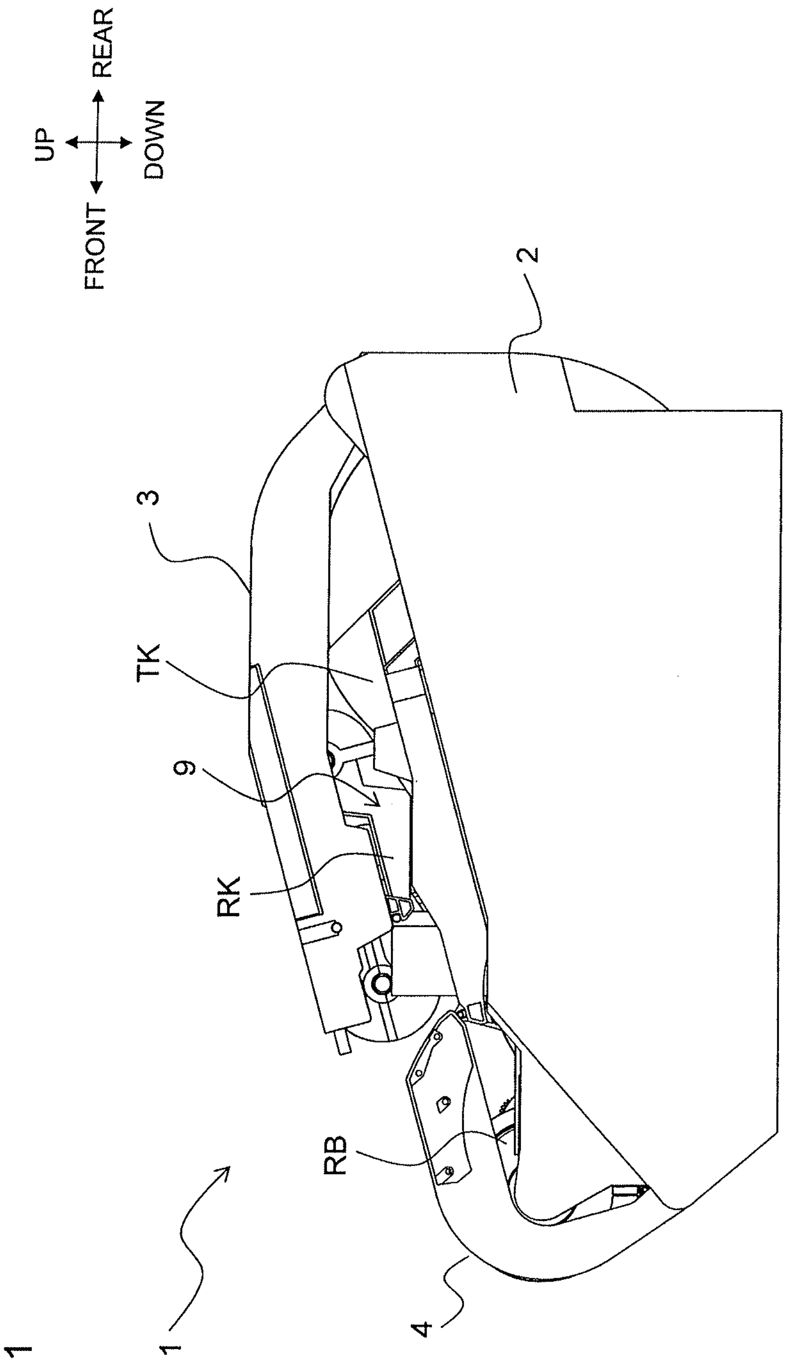
FIG. 1 is a right side view showing an outer appearance of the adhesive tape printer of an embodiment of the present disclosure.

The following describes one embodiment of the present disclosure with reference to accompanying drawings. Note that, in a case where "Front," "Rear," "Left", "Right," "Up," and "Down" are denoted in the drawings below, the terms front, rear, left, right, up, and down in the explanations within the description refer to the denoted directions.

General Configuration of Adhesive Tape Printer

First, the general configuration of the adhesive tape printer will be described based on FIGS. 1-6.

In FIGS. 1-6, an adhesive tape printer 1 comprises a housing 2 that constitutes the apparatus outer frame, a first opening/closing cover 3 positioned on the upper rear side of the housing 2, a second opening/closing cover 4 positioned on the upper front side of the housing 2, a first storage part 5 provided to the rear side of the housing 2, and a second storage part 6 and a third storage part 7 provided to the front side of the housing 2.

An adhesive tape cartridge TK is mounted at this time in an attachable and detachable manner to a first predetermined position 8 below the first opening/closing cover 3 (in a closed state) of the housing 2, as shown in FIG. 1, FIG. 2, FIG. 4, FIG. 5, FIG. 6, etc. The adhesive tape cartridge TK freely rotatably comprises a first roll R1 (details described later) on the rear side, and freely rotatably comprises a third roll R3 (details described later) on the front side. The adhesive tape cartridge TK is mounted to the first predetermined position 8, causing the first roll R1 to be stored in the first storage part 5, and the third roll R3 to be stored in the third storage part 7.

With the mounting of the above described adhesive tape cartridge TK, the first storage part 5 receives from above the above described first roll R1, wherein a print-receiving adhesive tape 150 is wound around an axis O1 in the substantial horizontal direction (refer to FIG. 2), storing the first roll R1 with the axis O1 of the above described winding in the horizontal direction (specifically, the left-right direction). In the print-receiving adhesive tape 150 are layered a base layer 153 on which preferred print is formed by a print head 10 described later, an adhesive layer 152 for affixing this base layer 153 to a suitable adherend (not shown), and a separation material layer 151 that covers this adhesive layer 152, in this order (refer to FIG. 3).

The first opening/closing cover 3 at this time is capable of opening and closing above the first storage part 5 by pivoting around a predetermined pivot axis K provided to the rear side end of the housing 2. Specifically, the first opening/closing cover 3 is pivotable from a closed position where the rear side of the housing 2 is covered (the state of FIG. 1, FIG. 2, FIG. 3, and FIG. 5) to an open position where the rear side of the housing 2 is exposed (the state of FIG. 4 and FIG. 6).

Further, the print head 10 and the above described feeding roller 11 are disposed vertically facing each other on the upper side of the substantial middle of the housing 2 interior communicated with the first storage part 5 and the third storage part 7.

The feeding roller 11 feeds the print-receiving adhesive tape 150 fed out from the above described first roll R1 stored in the above described first storage part 5 in a tape posture in which the tape width direction is the left-right direction (in other words, in a tape posture where the tape transverse cross-section is set as the substantially horizontal direction; refer to FIG. 10, etc., described later). Note that, at this time, the print-receiving adhesive tape 150 is layered in the order of the above described base layer 153, the adhesive layer 152, and the separation material layer 151, from one side in the thickness direction (upper side in this example) to the other side (lower side in this example), as described above (refer to FIG. 3). That is, the base layer 153 is positioned as the uppermost layer, and the separation material layer 151 is positioned as the lowermost layer. Further, this feeding roller 11 is driven by a feeding motor M1 via a gear mechanism (not shown). The feeding motor M1 is provided between the first storage part 5 as well as the second storage part 6 and the third storage part 7 disposed in a divided manner between a rear side and a front side as described above (further on the front side than the first storage part 5, and further on the rear side than the second storage part 6 and the third storage part 7), so that the axial direction of the output shaft (not shown) is in the left-right direction. Note that the feeding roller 11 is provided substantially above the above described feeding motor M1 in this example.

Figure 2:
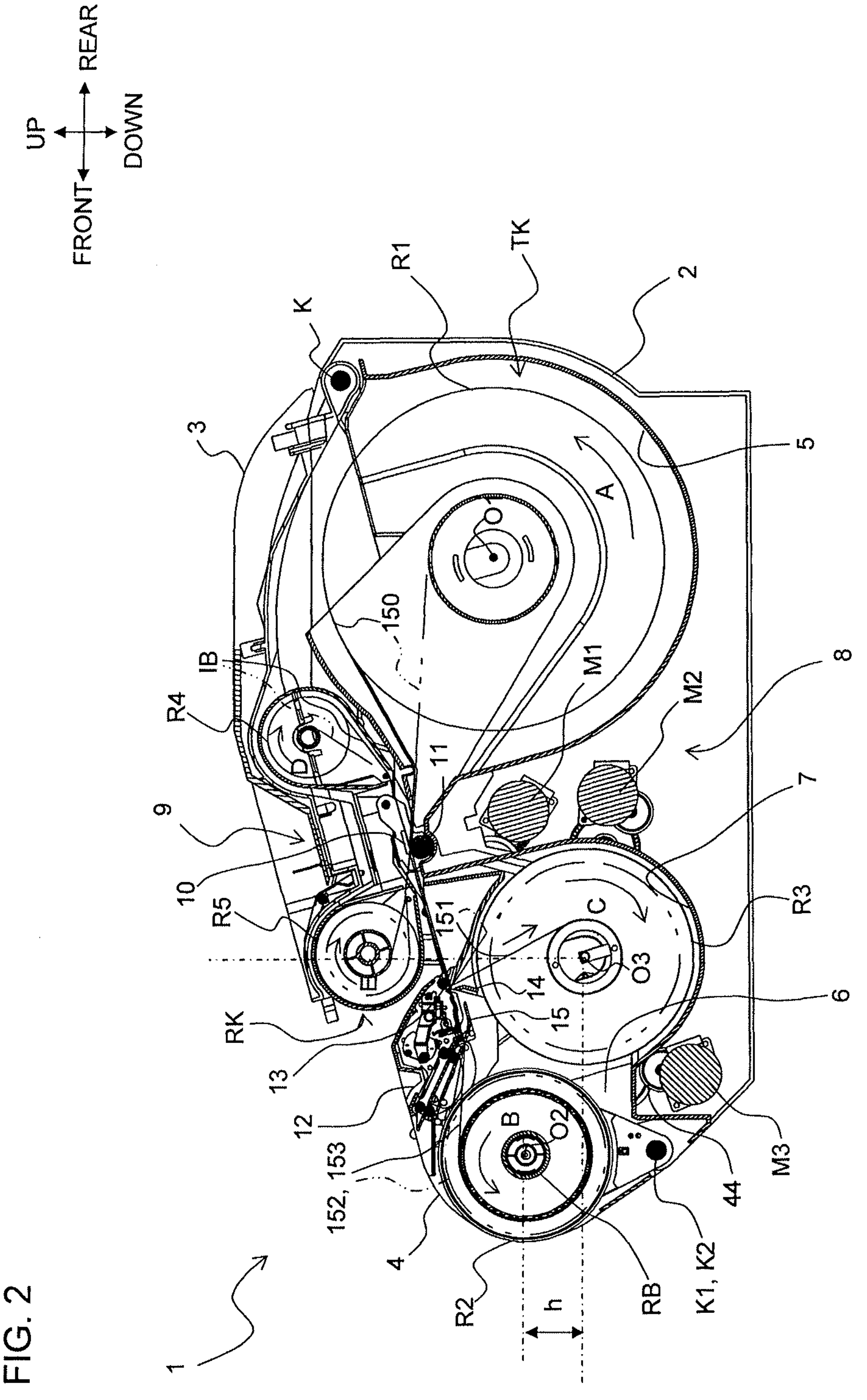
FIG. 2 is a vertical cross-sectional view showing the internal structure of the adhesive tape printer.

The print head 10 is provided to an area of the first opening/closing cover 3 substantially upwardly facing the feeding roller 11 so that it sandwiches the fed above described print-receiving adhesive tape 150 in coordination with the feeding roller 11 (refer to FIG. 2, etc.). Then, preferred print is formed on the above described base layer 153 of the fed above described print-receiving adhesive tape 150 using an ink ribbon IB of a ribbon cartridge RK comprising a ribbon supply roll R4 and a ribbon take-up roll R5, thereby forming an adhesive tape 150' with print (refer to FIG. 3, etc.).

That is, the ribbon cartridge RK is mounted in an attachable and detachable manner to a second predetermined position 9 below the first opening/closing cover 3 (in a closed state) of the housing 2 and above the above described adhesive tape cartridge TK, as shown in FIG. 1, FIG. 2, FIG. 4, FIG. 5, FIG. 6, etc. The ribbon cartridge RK freely rotatably comprises the ribbon supply roll R4, which feeds out the ink ribbon IB (refer to FIG. 2) for print formation by the above described print head 10, on the rear side, and freely rotatably comprises the ribbon take-up roll R5, which takes up the used ink ribbon IB after print formation, on the front side. The ribbon cartridge RK is mounted to the second predetermined position 9, disposing the ribbon supply roll R4 further toward the rear side than the above described print head 10 and the feeding roller 11 (refer to FIG. 2, etc.), and the ribbon take-up roll R5 further toward the front side than the print head 10 and the feeding roller 11 (refer to FIG. 2, etc.).

Figure 4:
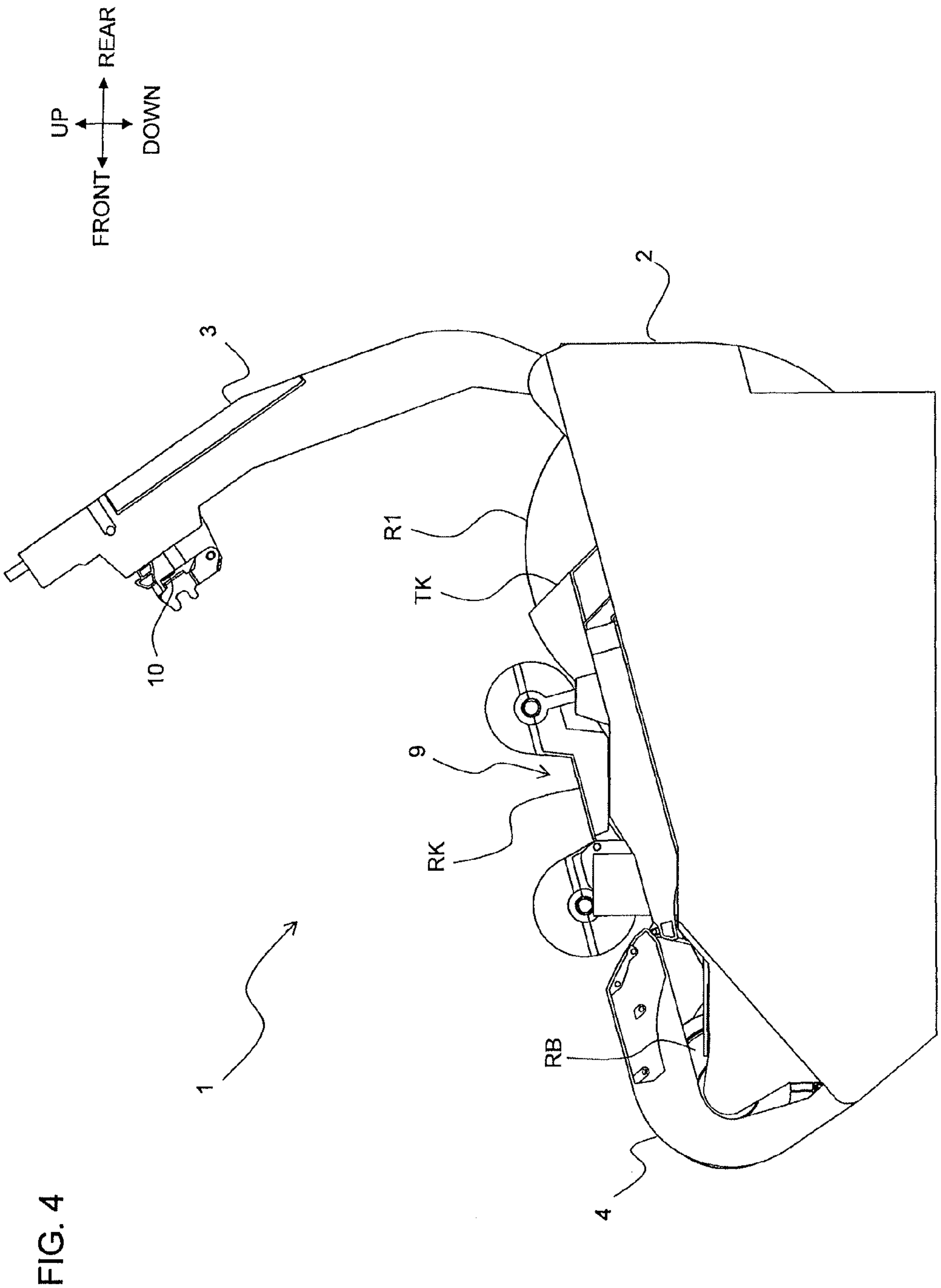
FIG. 4 is a right side view showing the outer appearance of the adhesive tape printer with only the first opening/closing cover in an open state.

Then, the ink ribbon IB fed out from the ribbon supply roll R4 (that rotates in direction D in FIG. 2) contacts the area below the print head 10 of the print head 10 and the feeding roller 11 disposed in a vertically facing manner. After the ink of the ink ribbon IB is transferred to the base layer 153 of the fed print-receiving adhesive tape 150 by the heat from the print head 10 to execute print formation, the used ink ribbon IB is taken up on the ribbon take-up roll R5 (that rotates in direction E in FIG. 2). Note that the ribbon cartridge RK is attachable and detachable with respect to the above described second predetermined position 9 by setting the first opening/closing cover 3 to an open state with the second opening/closing cover 4 in a closed state as is, as shown in FIG. 4.

The second storage part 6 receives a second roll R2 from above, storing the second roll R2. The second roll R2 winds the tape from which the separation material layer 151 was peeled from the aforementioned adhesive tape 150' with print (that is, a tape that includes the adhesive layer 152 and the base layer 153; hereinafter suitably and simply referred to as the "adhesive tape 152, 153 with print") around the above described axis O2 in the horizontal direction (specifically, the left-right direction). At this time, a core member 45 (details described later) for forming the second roll R2 is provided inside the housing 2 on the second opening/closing cover 4 side. Then, the second roll R2 is rotatably supported inside the second storage part 6 with this core member 45 supported by a support bracket RB. That is, the second roll R2 is connected to a take-up motor M3 via a gear mechanism (not shown) and driven to execute take-up by the take-up motor M3. This take-up motor M3 is provided below in the substantial middle of the second storage part 6 and the third storage part 7.

Figure 5:
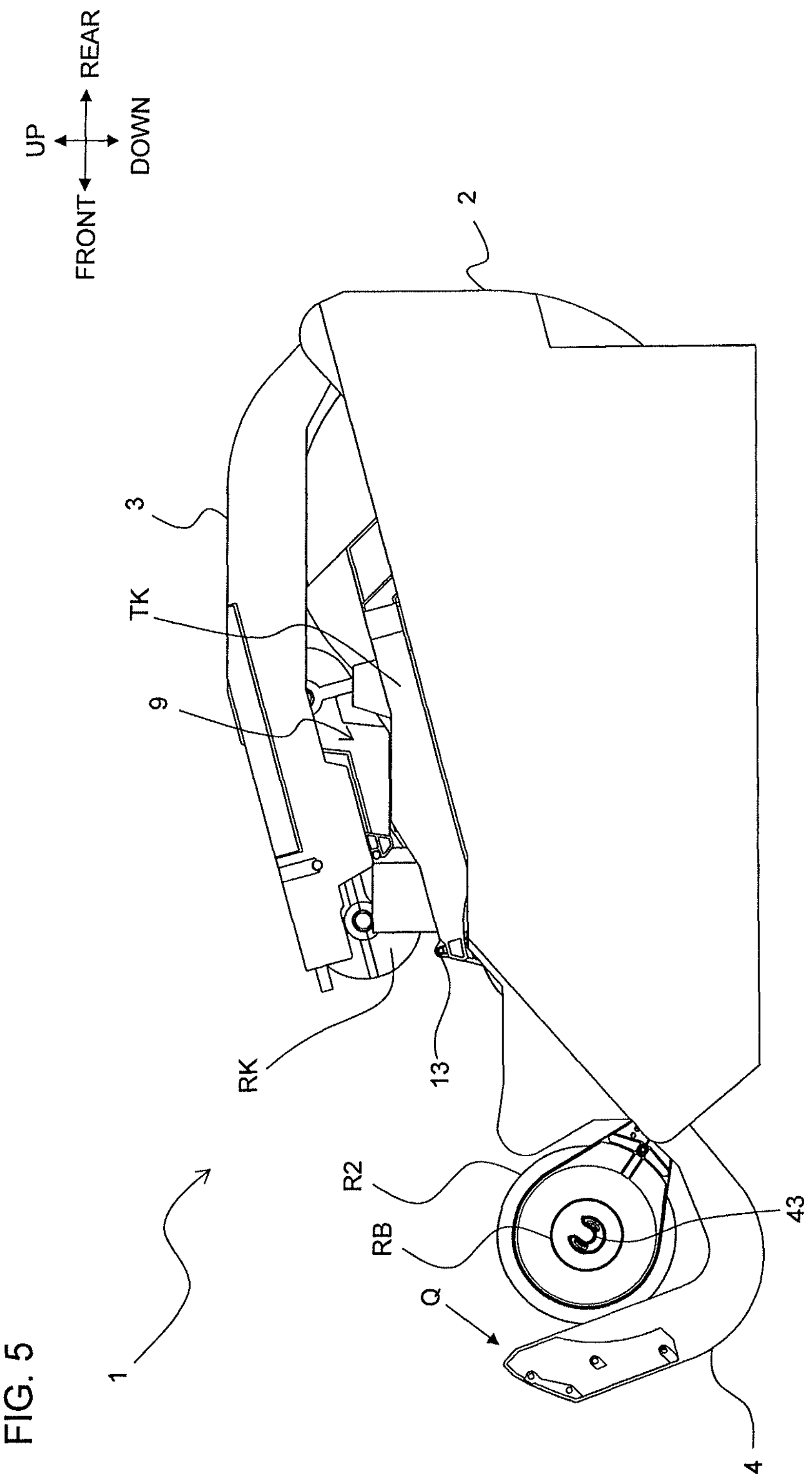
FIG. 5 is a right side view showing the outer appearance of the adhesive tape printer with only the second opening/closing cover in an open state.

Further, the second opening/closing cover 4 at this time is capable of opening and closing above the second storage part 6 by pivoting around a predetermined first pivot axis K1 provided to the front side end of the housing 2. Specifically, the second opening/closing cover 4 is pivotable from a closed position where the second storage part 6 of the housing 2 is covered (the state of FIG. 1, FIG. 2, and FIG. 4) to an open position where the second storage part 6 is exposed (the state of FIG. 5 and FIG. 6). The second roll R2, as shown in FIG. 5, is attachable and detachable with respect to the second storage part 6 by setting the second opening/closing cover 4 to an open state with the first opening/closing cover 3 in a closed state as is.

With the mounting of the above described adhesive tape cartridge TK, the third storage part 7 receives the above described third roll R3 from above, storing the third roll R3. The third roll R3 winds the separation material layer 151, which was peeled from the adhesive tape 150' with print in a way that separates it from the aforementioned adhesive tape 152, 153 with print, around the above described axis O3 in the horizontal direction (specifically, the left-right direction). The third roll R3 is connected to a take-up motor M2 for driving the take-up of the third roll R3 via a gear mechanism (not shown). The take-up motor M2 is provided below the above described feeding motor M1.

Figure 7:
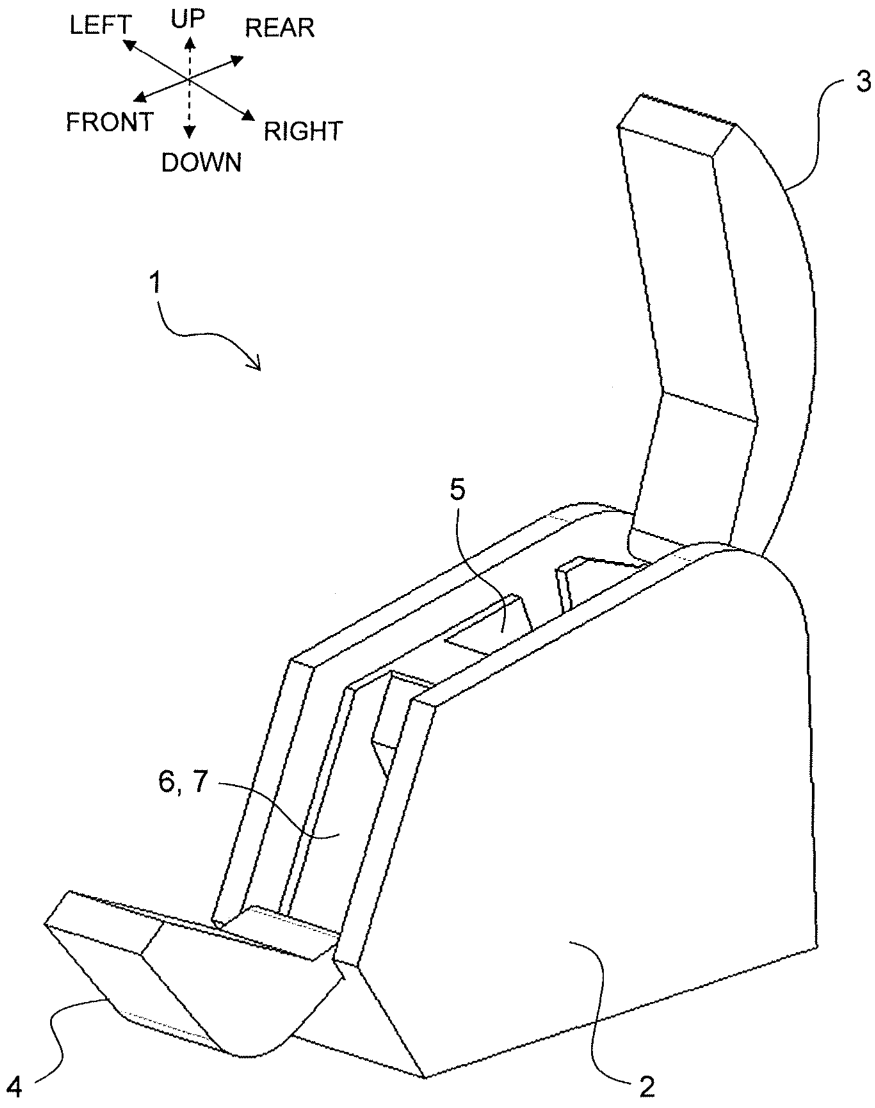
FIG. 7 is a perspective view showing a state with the housing provided to the adhesive tape printer extracted and the first and second opening/closing covers in an open state.
Figure 8:
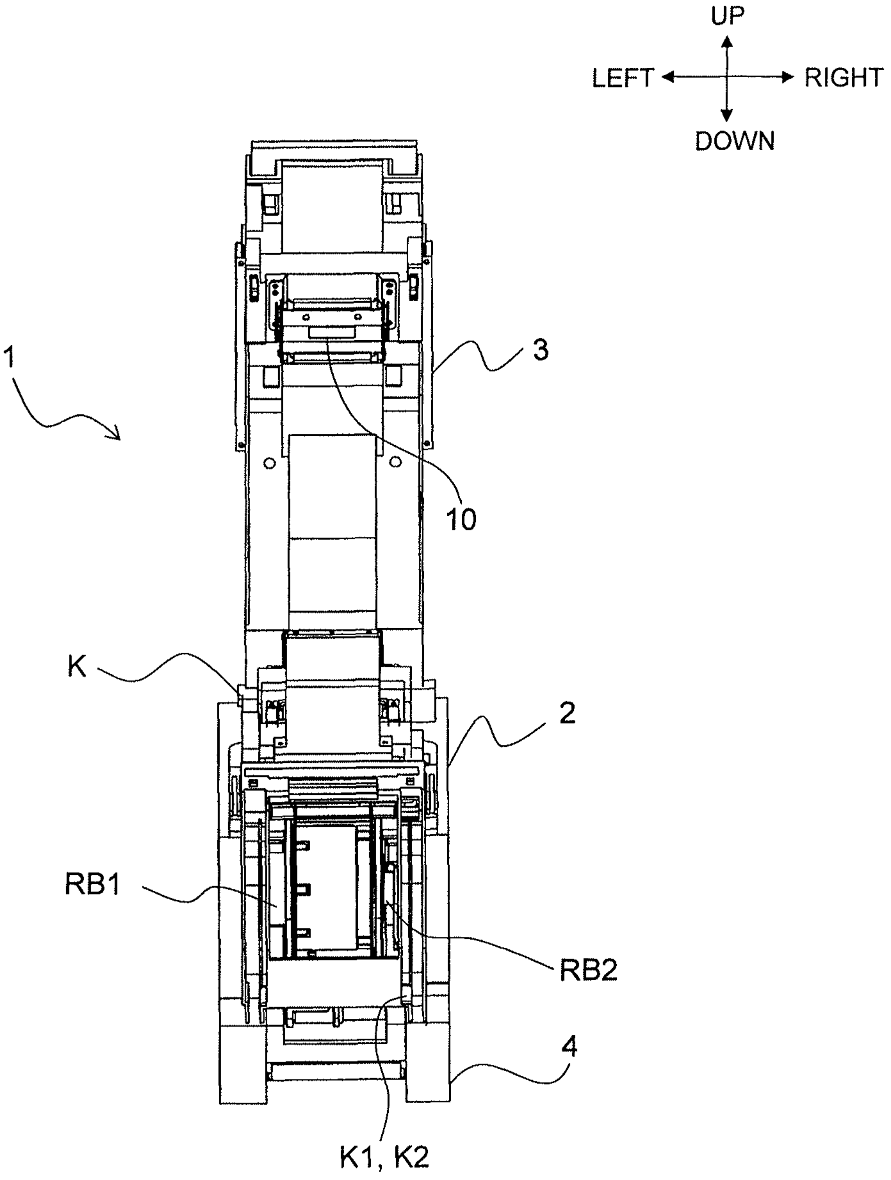
FIG. 8 is an arrow view of the adhesive tape printer with the adhesive tape cartridge and the ribbon cartridge removed, from direction P in FIG. 6.

Note that the housing 2 is in the shape of a box with a narrow width, as shown in FIG. 7. That is, the housing 2 comprises a long dimension in the front-rear direction, substantially corresponding to the overall diameters of each of the above described first roll R1, second roll R2, and third roll R3. On the other hand, the housing 2 comprises a short dimension in the left-right direction, substantially corresponding to the width of the above described print-receiving adhesive tape 150, adhesive tape 150' with print, etc.

Figure 6:
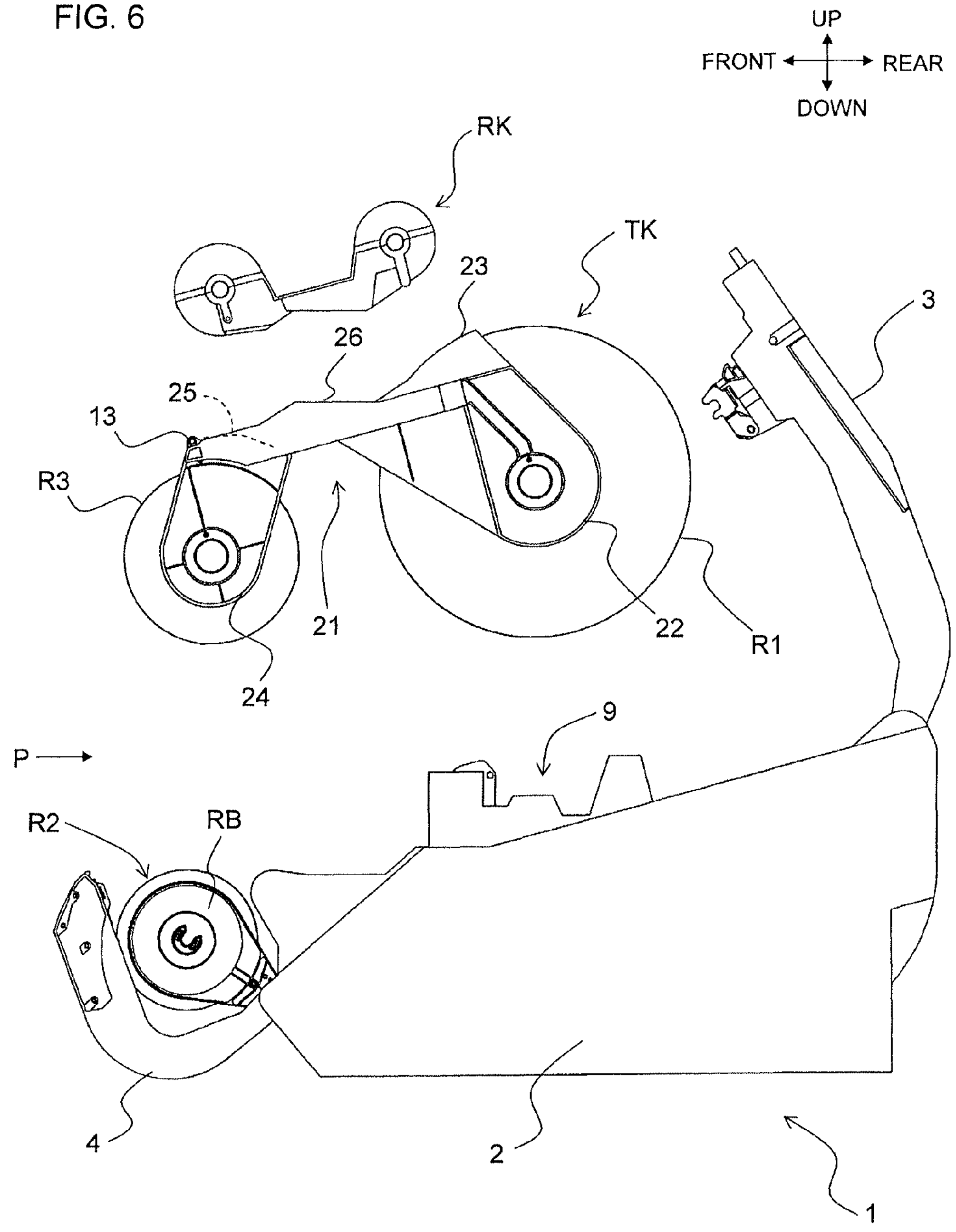
FIG. 6 is an exploded side view showing the adhesive tape printer with the first and second opening/closing covers open and the adhesive tape cartridge and ribbon cartridge removed.

Then, as shown in FIG. 1, with the first opening/closing cover 3 and the second opening/closing cover 4 in a closed state, the first roll R1, the second roll R2, and the third roll R3 respectively stored in the first storage part 5, the second storage part 6, and the third storage part 7 are covered by the first opening/closing cover 3 and the second opening/closing cover 4 from above. On the other hand, with the first opening/closing cover 3 and the second opening/closing cover 4 open as shown in FIG. 6, the first storage part 5, the second storage part 6, and the third storage part 7 are all exposed.

Further, a cutter mechanism 14 for cutting the adhesive tape 152, 153 with print after the separation material layer 151 was peeled is disposed to an area that is further on the rear side than the second roll R2 of the second opening/closing cover 4 when the second opening/closing cover 4 is closed.

Hence, the first roll R1, the second roll R2, and the third roll R3 are respectively wound around the axes O1, O2, and O3 in the substantial horizontal direction, as described above. When the tape is cut by the cutter mechanism 14 at this time, a tensile force of a certain degree is preferably applied to the adhesive tape 152, 153 with print subject to cutting, pulling the tape surface tight. Here, according to this embodiment, the height direction position of the axis O2 of the second roll R2 supported by the support bracket RB disposed inside the second storage part 6 below the second opening/closing cover 4 in a closed state is configured to be higher than a height direction position of the axis O3 of the third roll R3 that winds the separation material layer 151 inside the third storage part 7 of the adhesive tape cartridge TK mounted to the first predetermined position 8 below the first opening/closing cover 3 in a closed state, by an amount equivalent to a distance h (refer to FIG. 2).

Summary of Apparatus Movement

In the above described configuration, when the print-receiving adhesive tape 150 fed out from the first roll R1 (rotating in direction A in FIG. 2, FIG. 3, and FIG. 11 described later) stored in the first storage part 5 with the first opening/closing cover 3 and the second opening/closing cover 4 closed is fed toward the front side by the feeding roller 11, preferred print is formed on the base layer 153 of that fed print-receiving adhesive tape 150 by the print head 10, forming the adhesive tape 150' with print. Subsequently, the adhesive tape 150' with print is further fed toward the front side, and the separation material layer 151 is peeled at a peeling part 13. The third roll R3 (that rotates in direction C in FIG. 2, FIG. 3, and FIG. 11 described later) inside the third storage part 7 is formed by the peeled separation material layer 151.

On the other hand, the adhesive tape 152, 153 with print from which the separation material layer 151 was peeled are further fed toward the front side, introduced to the second storage part 6, and wound inside the second storage part 6, forming the second roll R2 (that rotates in direction B in FIG. 2). At that time, the cutter mechanism 14 is provided further on the rear side than the second roll R2, that is, on the upstream side along the feeding path, and this cutter mechanism 14 cuts the adhesive tape 152, 153 with print on which print was formed and from which the separation material layer 151 was peeled. With this arrangement, the adhesive tape 152, 153 with print wound around the second roll R2 are cut based on a timing preferred by the user, making it possible to remove the second roll R2 from the second storage part 6 after cutting.

Detailed Structure of Each Component

Next, the detailed structure of each component of the adhesive tape printer 1 of a general configuration such as described above will be described in order.

Detailed Structure of Adhesive Tape Cartridge

As shown in the above described FIG. 6, FIG. 8, and FIGS. 9-11, the adhesive tape cartridge TK comprises a connecting arm 21 of a cross-sectional shape that is substantially box-like with an open left side. The above described first roll R1 and the third roll R3 are connected by the above described connecting arm 21. The connecting arm 21 freely rotatably supports the first roll R1 on the rear side, and freely rotatably supports the third roll R3 on the front side. Further, the connecting arm 21 comprises a pair of left and right first bracket parts 22 and 22 (only the first bracket part 22 on the right side is shown in FIG. 6) on the rear side, and a pair of left and right second bracket parts 24 and 24 (only the second bracket part 24 on the right side is shown in FIG. 6) on the front side.

The first bracket parts 22 and 22 hold the first roll R1 rotatably around the axis O1, sandwiching the first roll R1 from both the left and right sides. These first bracket parts 22 and 22 are connected by a first connecting part 23 provided in an extended manner in the substantially horizontal direction on the upper end.

The second bracket parts 24 and 24 hold the third roll R3 rotatably around the axis O3, sandwiching the third roll R3 from both the left and right sides. These second bracket parts 24 and 24 are connected by a second connecting part 25 provided in an extended manner in the substantially horizontal direction on the upper end.

Then, the above described first bracket parts 22 and 22 and the above described first connecting part 23 on the rear side, and the above described second bracket parts 24 and 24 and the above described second connecting part 25 on the front side are connected by a pair of left and right roll connecting beam parts 26 and 26.

Figure 10:
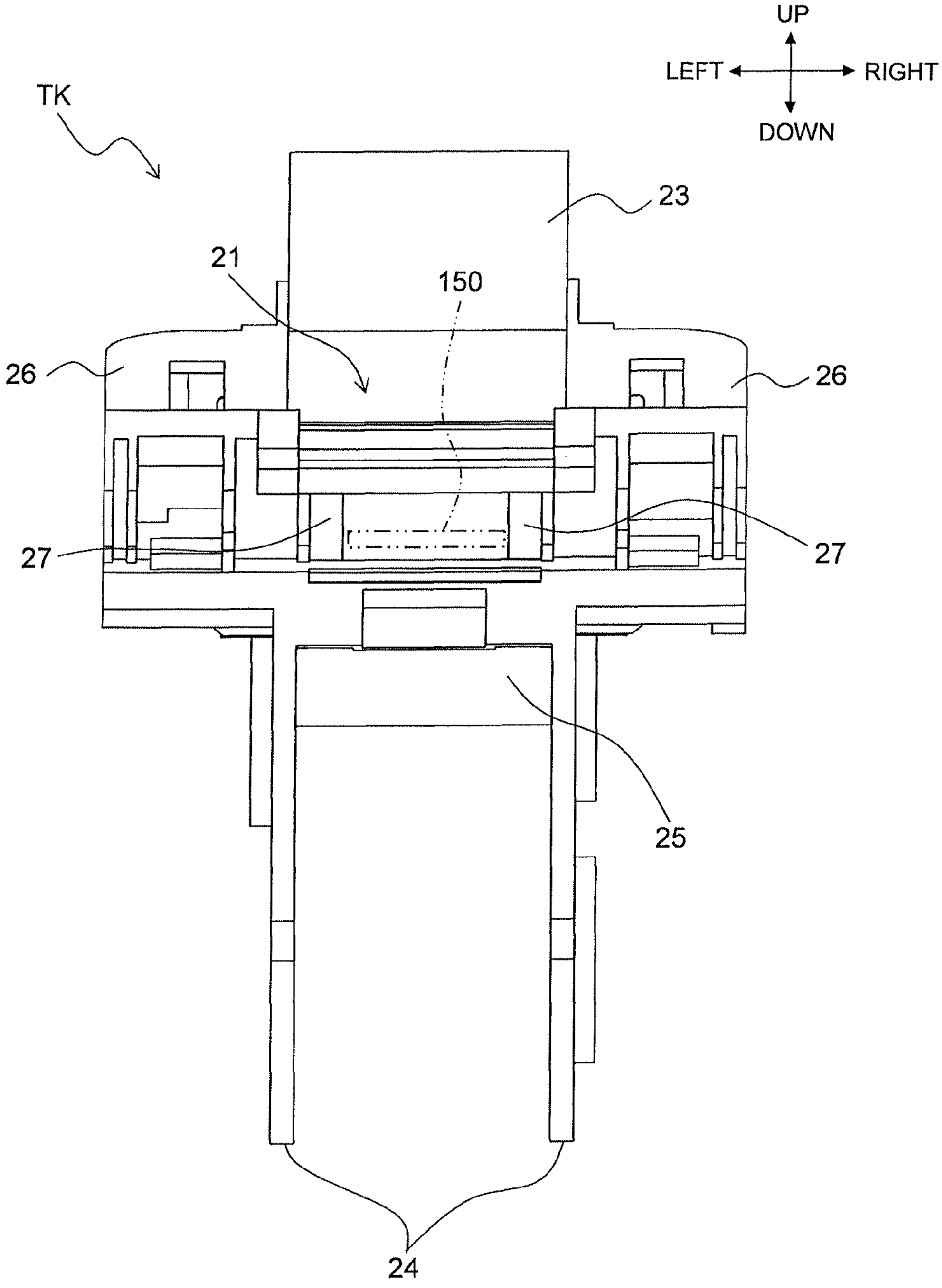
FIG. 10 is a front view showing the overall configuration of the adhesive tape cartridge.
Figure 11:
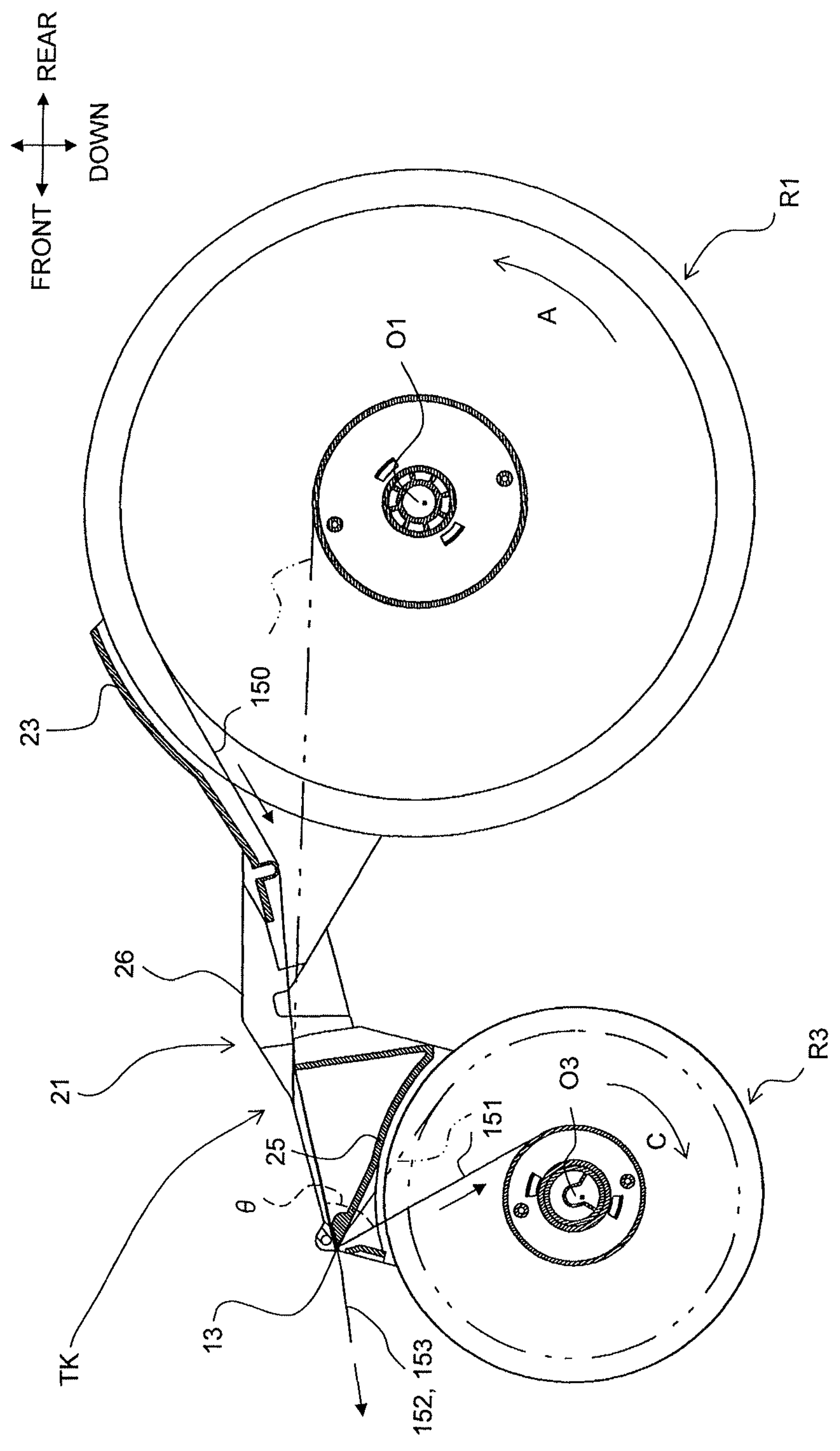
FIG. 11 is a sectional side view of the adhesive tape cartridge, from the right side.

Further, a pair of left and right guide parts 27 is provided to an area of the above described connecting arm 21 that is in the middle of the first roll R1 and the third roll R3 along the tape feeding path (the first connecting part 23 in this example) so as to protrude downward from the first connecting part 23 (refer to FIG. 10 and FIG. 11). The guide parts 27 cause the print-receiving adhesive tape 150 (refer to the imaginary lines in FIG. 10) fed out from the first roll R1 to pass in a tape posture in which the tape width direction is set to the left-right direction, and substantially contact both ends in the tape width direction during the passing, guiding the tape width direction.

Peeling Part

Figure 3:
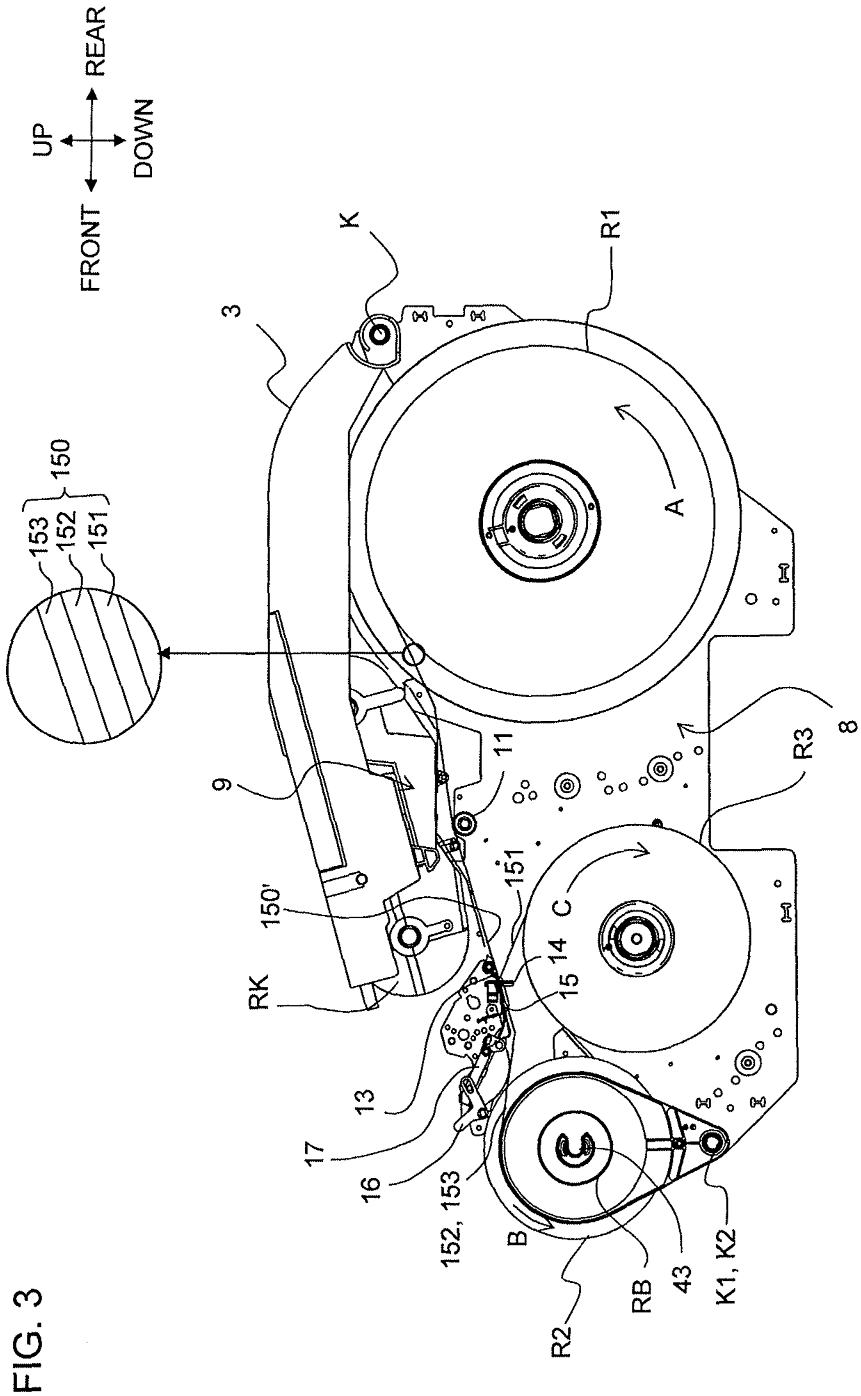
FIG. 3 is an explanatory view showing the tape feeding path of the adhesive tape printer.
Figure 9:
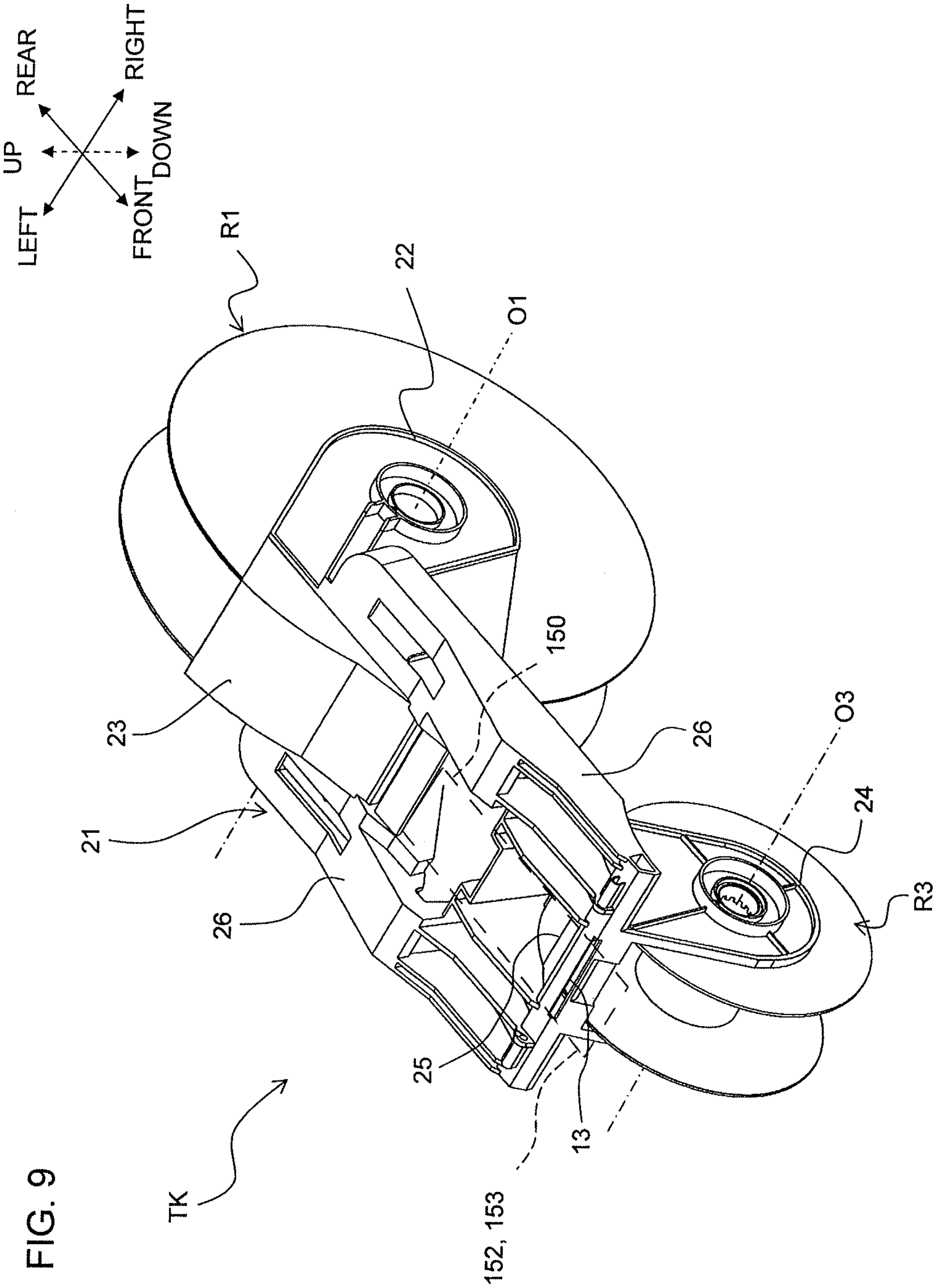
FIG. 9 is a perspective view showing the overall configuration of the adhesive tape cartridge.

Further, the connecting arm 21, as shown in FIG. 9 and FIG. 11, comprises the peeling part 13 that includes a horizontal slit shape, for example, further on the downstream side along the tape feeding path than the above described guide parts 27 (refer to FIG. 2, FIG. 3, etc., as well). The peeling part 13 peels the separation material layer 151 from the print-receiving adhesive tape 150 fed out from the first roll R1 and fed toward the front side along a predetermined middle feeding path FP (the feeding path from the roll feed-out position to the peeling part 13; refer to FIG. 12A described later).

At this time, as shown in FIG. 11, in the adhesive tape cartridge TK, the first roll R1 feeds out the print-receiving adhesive tape 150 from an outer peripheral part while rotating in the counterclockwise direction (direction A), as viewed from the right side. On the other hand, the third roll R3 brings in and takes up the separation material layer 151 peeled by the peeling part 13 on a roll outer peripheral part in a direction (substantially downward toward the right in FIG. 12A) substantially opposite the transport direction (leftward in FIG. 12A) of the print-receiving adhesive tape 150 fed out and fed from the first roll R1, while rotating in the clockwise direction (direction C) as viewed from the above described right side. As a result, an angle 0 at which the peeled separation material layer 151 bends when peeled by the peeling part 13 from the print-receiving adhesive tape 150 fed toward the front side is an acute angle.

Figure 12A:
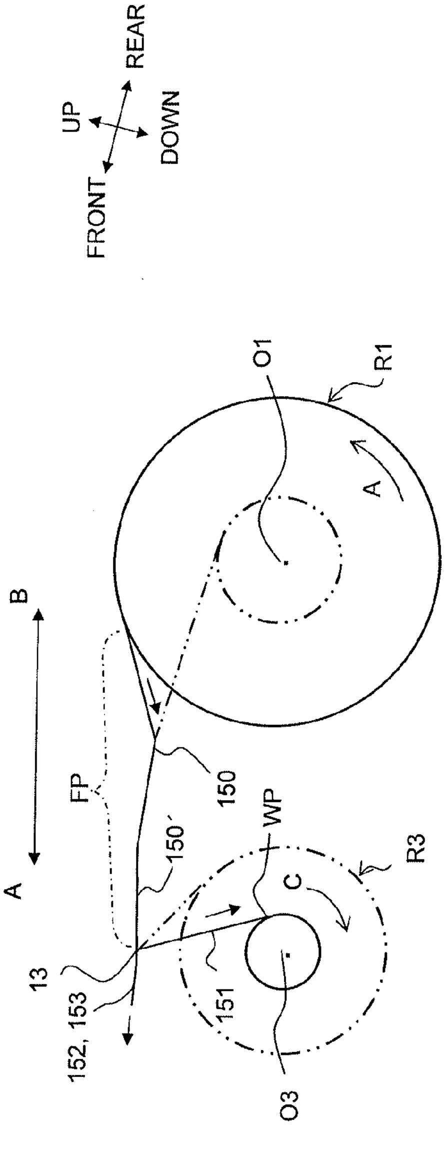
FIG. 12A is an explanatory view showing the behavior of each roll of the adhesive tape cartridge, in the rotating direction and on the tape feeding path.

Further, at this time, as shown in FIG. 12A, the position of the peeling part 13 along the tape transport direction (the direction of arrow A-B in FIG. 12) on the above described middle feeding path FP is disposed so that it is further on one side (the left side in FIG. 12A) than the position of a take-up position WP in the above described predetermined direction (the direction of arrow A-B in FIG. 12) when the third roll R3 is in a minimum outer diameter state (the state of the solid lines in the above described FIG. 12, FIG. 2, and FIG. 11), at least. Hence, the take-up position WP is the position where the separation material layer 151 is brought in toward the outer diameter of the third roll R3, merging with the layered structure. Further, the above described one side in the predetermined direction is, in other words, the downstream side along the transport direction of the middle feeding path FP.

Note that, as previously described, in FIG. 2, FIG. 11, and FIG. 12, the state in which the print-receiving adhesive tape 150 of the first roll R1 of the adhesive tape cartridge TK is not consumed and the separation material layer 151 is not yet wound on the third roll R3 (initial state) is indicated by the solid lines. Then, the state in which the print-receiving adhesive tape 150 of the first roll R1 is consumed to a certain degree by the above described feeding and print formation and the separation material layer 151 is wound around the third roll R3 is indicated by the imaginary lines.

Detailed Structure of Cutter Mechanism

Figure 13:
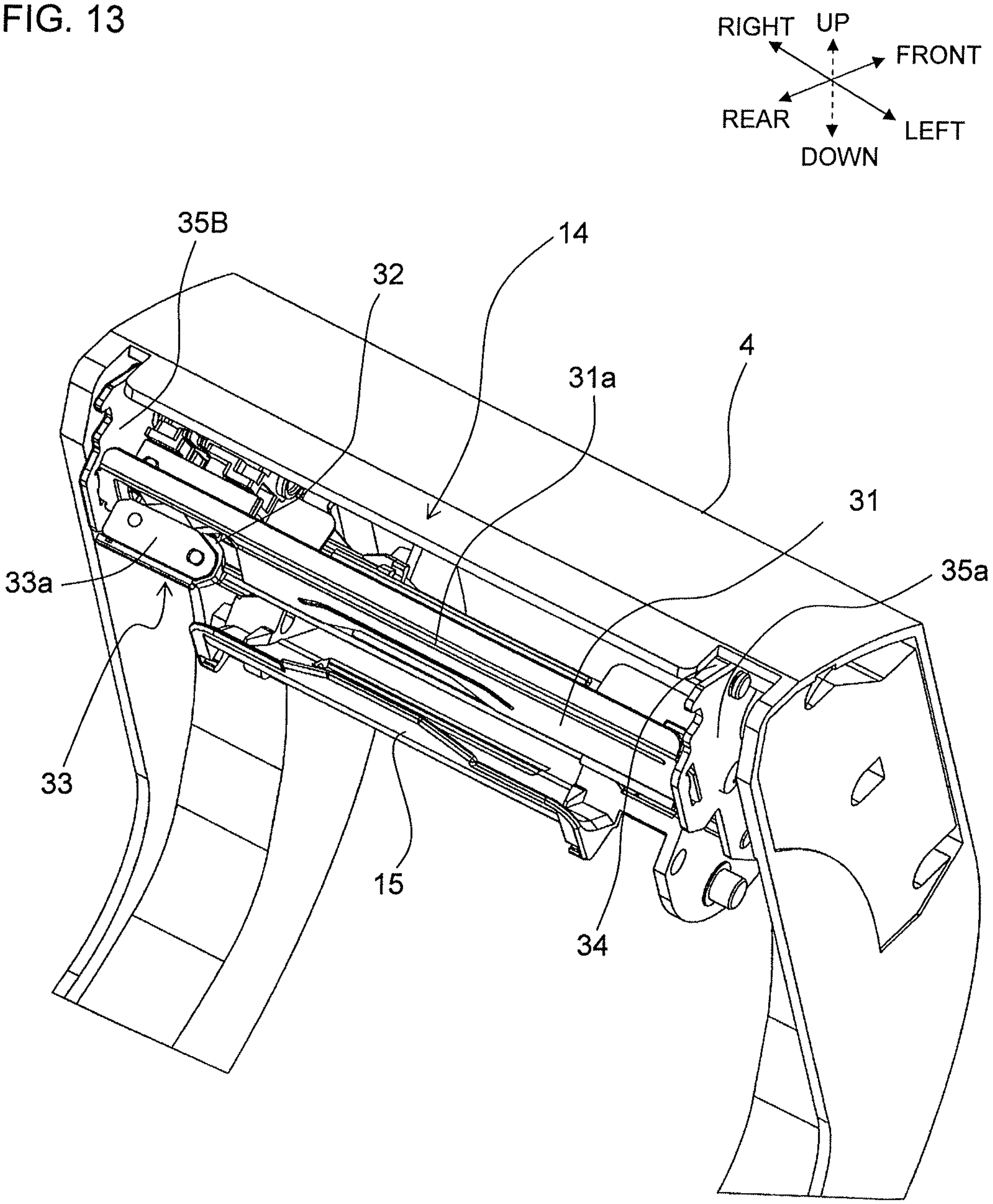
FIG. 13 is a perspective view showing the cutter mechanism provided to the second opening/closing cover (with the shoot in the lower position).
Figure 14:
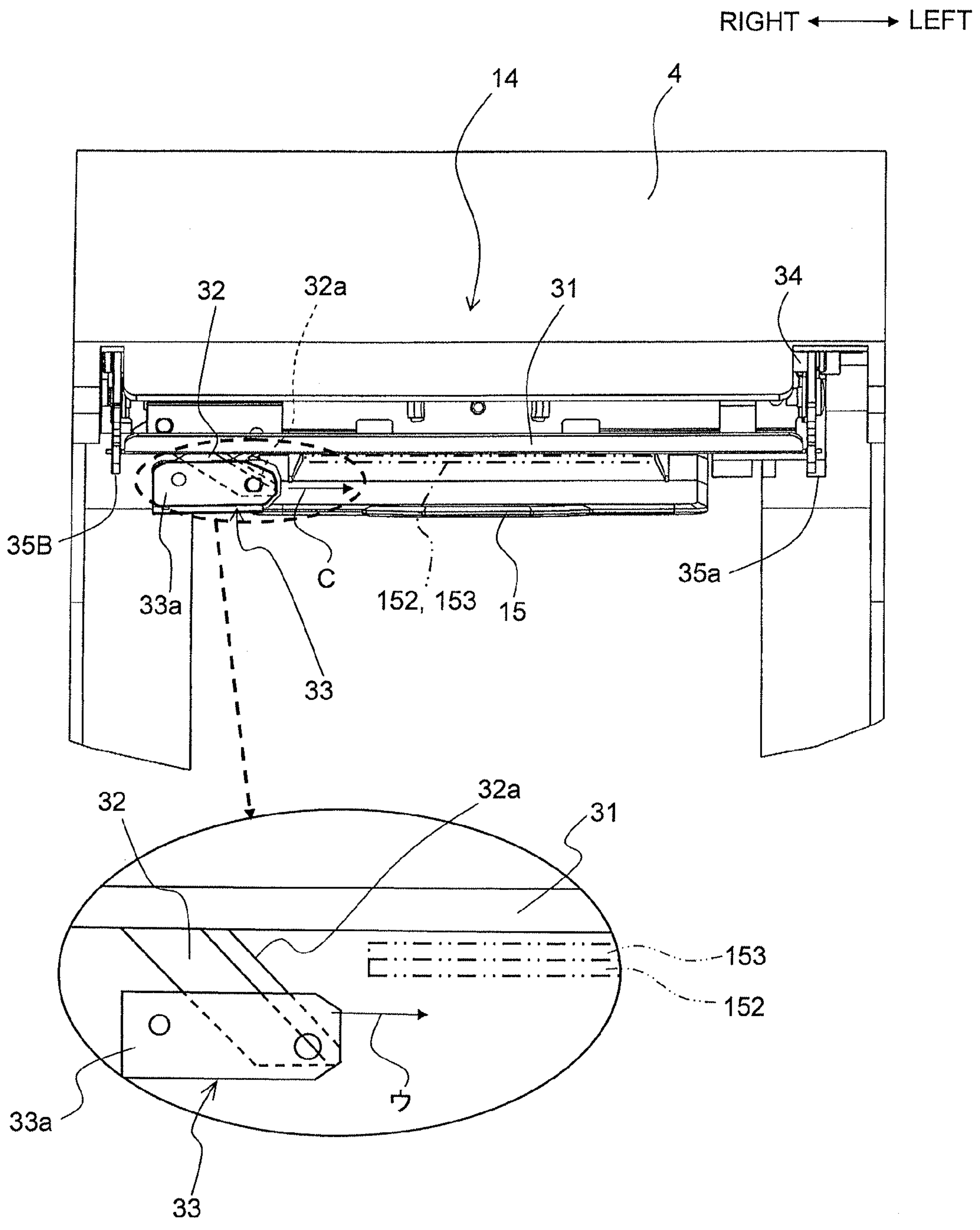
FIG. 14 is an arrow view showing the cutter mechanism, as viewed from direction Q in FIG. 5.
Figure 15:
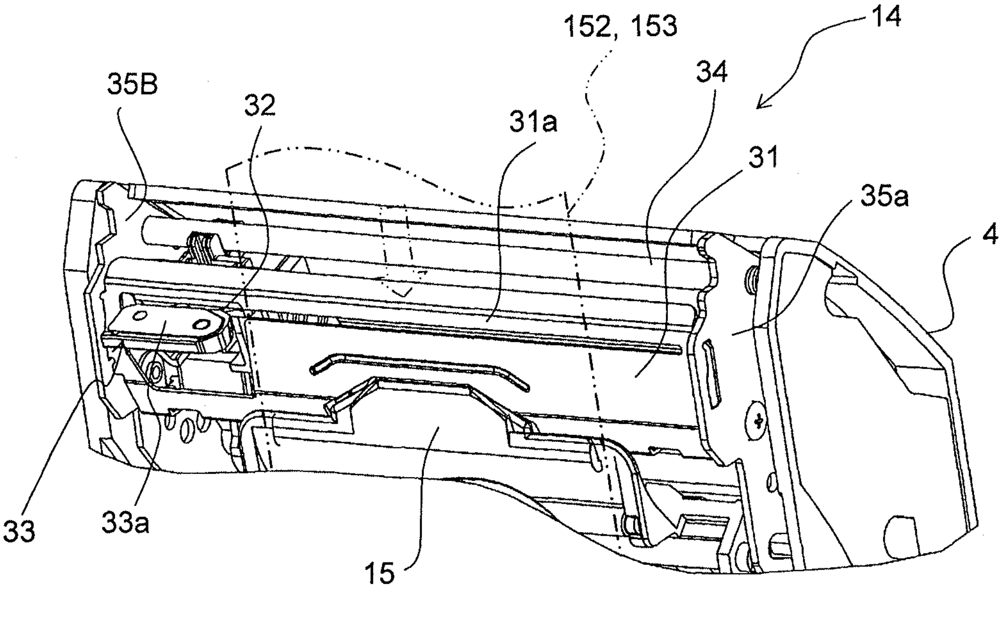
FIG. 15 is an enlarged perspective view of the main section in FIG. 13 (with the shoot in the upper position).

As shown in FIGS. 13-15, the cutter mechanism 14 comprises a guide plate 31, a movable blade 32, a carriage 33 comprising a movable blade support part 33*a* configured to support the movable blade 32, and a guide rail 34.

The guide plate 31 is provided in an extended manner in the tape width direction to the inside of the releasing edge side of the second opening/closing cover 4, further on the downstream side in the tape transport direction than the feeding roller 11. This guide plate 31 is supported by a pair of left and right support plates 35*a* and 35*b* with respect to the second opening/closing cover 4. Then, the guide plate 31 contacts and guides the upper surface of the adhesive tape 152, 153 with print (in other words, the upper surface of the base layer 153; corresponding to the surface of the one side end in the thickness direction) fed by the feeding roller 11 inside the above described housing 2 in a posture in which the tape width direction is the left-right direction (refer to the imaginary lines in FIG. 14 and FIG. 15).

The above described movable blade 32 is disposed below the guide plate 31 so that a blade edge 32*a* vertically faces the guide plate 31 (so that the blade edge 32*a* points upward in this example). The movable blade 32 is guided by the guide rail 34, traveling in the tape width direction along the guide plate 31 by the above described freely traveling carriage 33, and performs cutting (refer to arrow C in FIG. 14). The above described guide rail 34 is supported by the above described pair of left and right support plates 35*a* and 35*b* with respect to the second opening/closing cover 4.

The movable blade 32 advances toward the adhesive tape 152, 153 with print from the adhesive layer 152 of the lowermost layer by the above described travel of the carriage 33 along the guide rail 34, while sandwiching the adhesive tape 152, 153 with print between itself and the guide plate 31, performing the above described cutting. At that time, the above described movable blade support part 33*a* supports the carriage 33 so that the movable blade 32 slopes (slopes downward in this example) toward the above described travel direction along the tape width, in a way that causes the blade edge 32*a* (refer to FIG. 14) of the movable blade 32 to press the adhesive tape 152, 153 with print toward the guide plate 31 direction. With this arrangement, the adhesive tape 152, 153 with print are cut in the width direction by the advancing and cutting performed by the downward disposed, obliquely upward pointing blade edge 32*a* of the movable blade 32 from the adhesive layer 152 of the lowermost layer while the upper surface (specifically, the upper surface of the base layer 153 after print formation by the print head 10) is contacted and guided by the guide plate 31. A slit 31*a* is provided in the tape width direction to the guide plate 31 at this time, for guiding the travel of the movable blade 32 by the carriage 33.

Note that a shoot 15 for switching the feeding path of the adhesive tape 152, 153 with print between a side toward the second roll R2 and a side toward the discharging exit 12 is provided further on the downstream side than the guide plate 31 along the tape transport direction (the function of this shoot 15 will be described later).

Detailed Structure of Support Bracket

Figure 16:
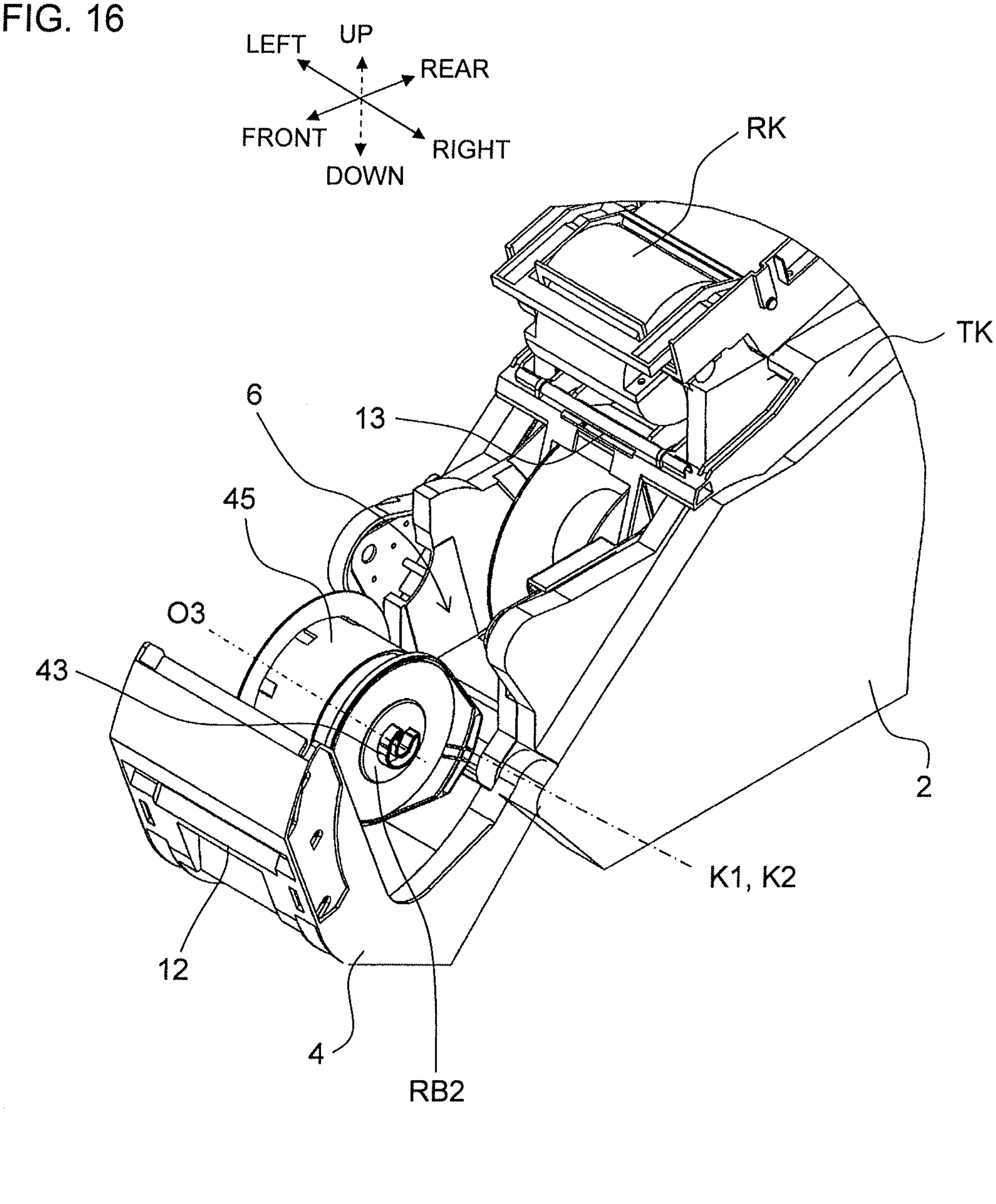
FIG. 16 is a perspective view showing the state in which the second opening/closing cover is open and the support bracket of the second roll is pivoted frontward.
Figure 17:
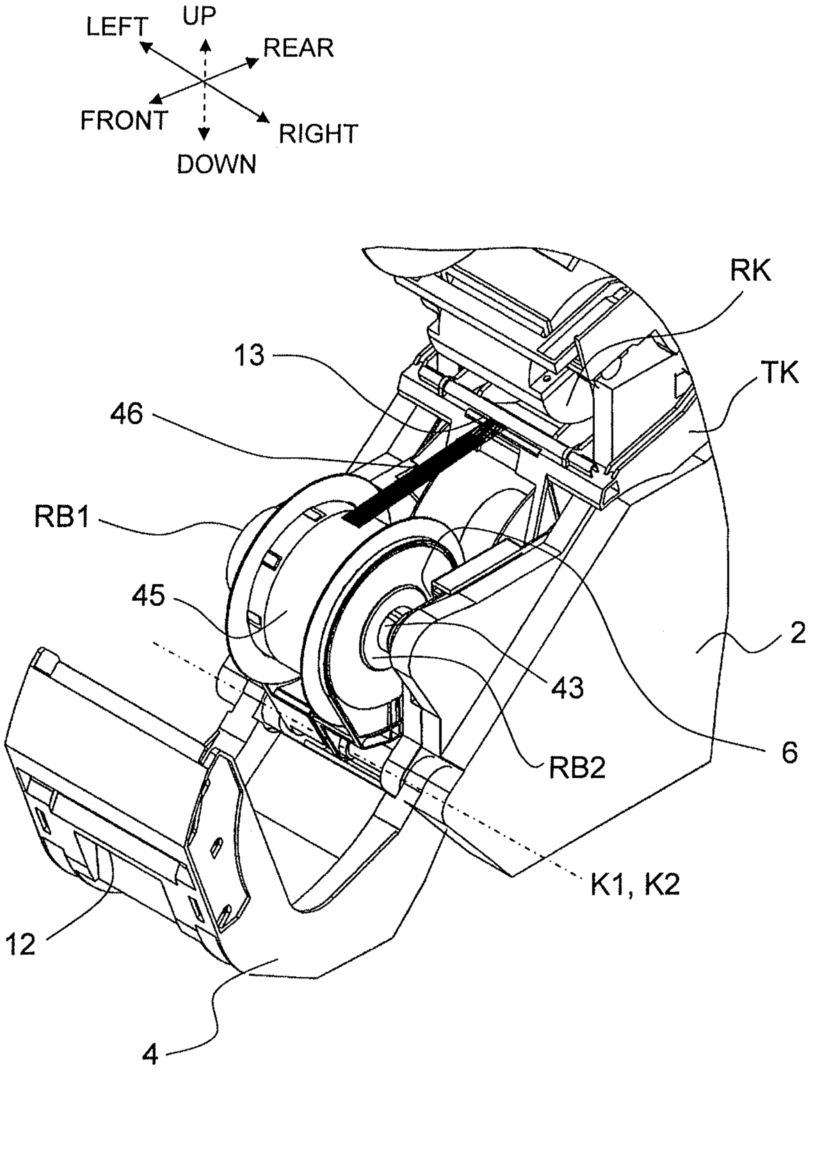
FIG. 17 is a perspective view showing the state in which the support bracket of the second roll is pivoted rearward, connecting the connection tape piece from the core member.
Figure 18:
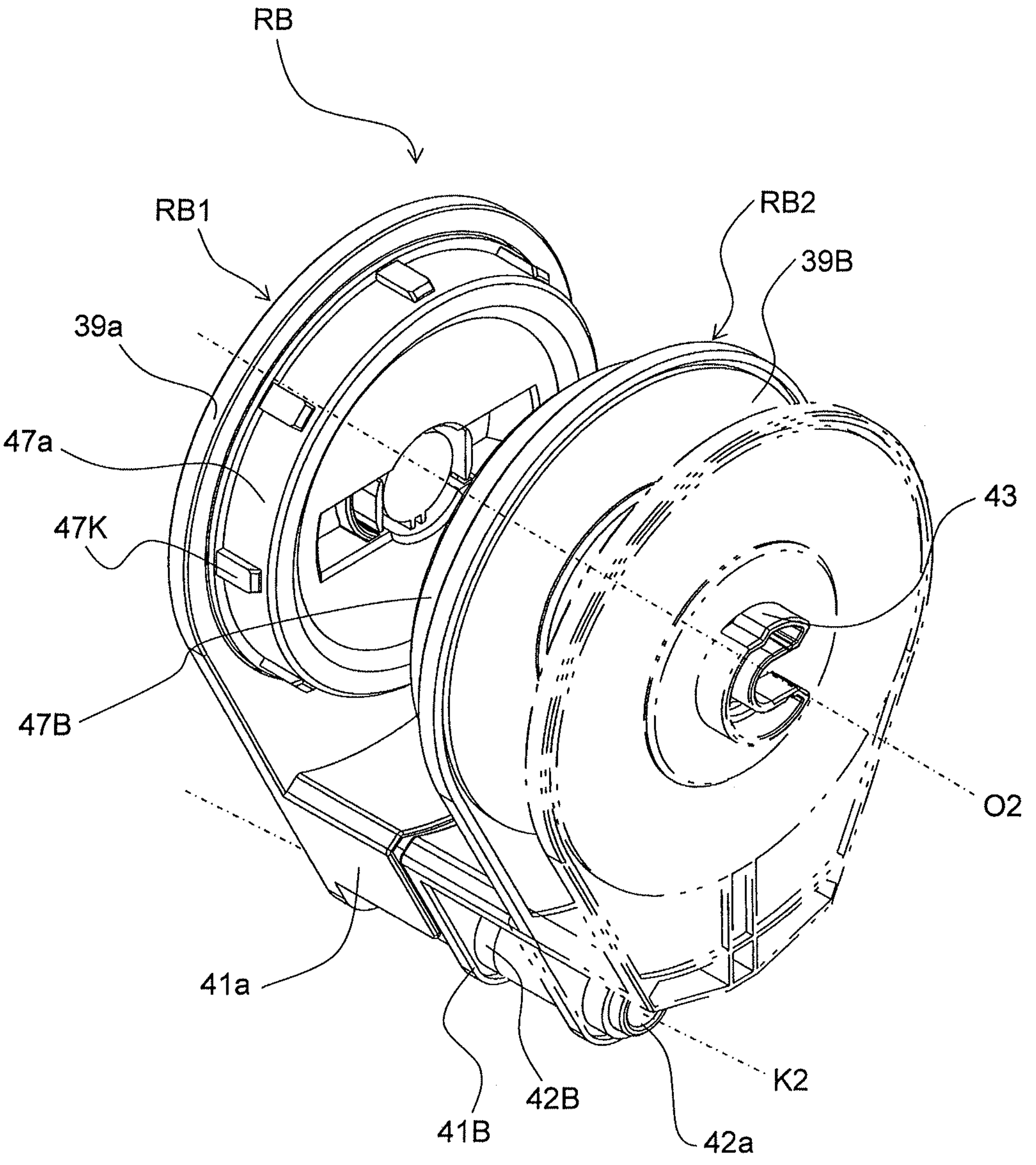
FIG. 18 is a perspective view showing the detailed structure of the support bracket of the second roll.

In FIGS. 16-18, as already described, the second opening/closing cover 4 is rotatable from the above described closed position where the second storage part 6 of the housing 2 is covered to the above described open position where the second storage part 6 is exposed, around the predetermined first pivot axis K1 provided on the front side of the housing 2. At this time, the support bracket RB supports the above described second roll R2 rotatably around the predetermined second pivot axis K2 positioned on the front side of the housing 2. The second roll R2, as previously described, is generated with the winding of the adhesive tape 152, 153 with print after print has been formed on the base layer 153 by the print head 10 and the separation material layer 151 has been peeled (or the adhesive tape 150' with print that includes the separation material layer 151) in the interior of the housing 2, on the front side.

That is, the support bracket RB is pivotably configured from a use position (the position shown in FIGS. 1-4 and FIG. 17, for example) where it is positioned on the closed direction side of the above described second opening/closing cover 4 where the second roll R2 is not attachable or detachable, to a removal position (the position shown in FIG. 5, FIG. 6, and FIG. 16, for example) where it is positioned on the open direction side of the second opening/closing cover 4 where the second roll R2 is attachable and detachable, around the above described second pivot axis K2. Note that, in this example, the second pivot axis K2 is in the same position as the above described first pivot axis K1 (that is, a common axis).

Then, the support bracket RB, as shown in FIG. 18, comprises a second bracket RB2 and a first bracket RB1, which are provided facing each other so that the second roll R2 is sandwiched on both sides along the axis O2 of the second roll R2. That is, the first bracket RB1 and the second bracket RB2 respectively comprise substantially circular shaped circular parts 39*a* and 39*b* and base parts 41*a* and 41*b* that radially bulge from the circular parts 39*a* and 39*b*.

The dimension of the base part 41*a* of the first bracket RB1 along the above described second pivot axis K2 is larger than the base part 41*b* of the second bracket RB2. Then, a cylindrical-shaped guide protrusion 42*a* is provided in a protruding manner along the above described second pivot axis K2 direction to the inside of the base part 41*a* (the side of the second bracket RB2 facing the base part 41*b*; the lower right side in FIG. 18). Further, a substantially annular rotating part 47*a* is mounted rotatably around the axis O2 (refer to FIG. 16 and FIG. 18) of the second roll R2 via a bearing (not shown) to the inside (the lower right side in FIG. 18) of the circular part 39*a* of the first bracket RB1. A plurality of protrusions 47*k* configured to protrude radially is provided to the outer peripheral surface of the rotating part 47*a*.

The base part 41*b* of the second bracket RB2 bends in a substantial L shape corresponding to the structure of the first bracket RB1 such as described above (refer to FIG. 18). A cylindrical-shaped guide tube 42*b* is provided in a protruding manner along the second pivot axis K2 direction to the outside of the base part 41*b* (the side opposite the side facing the base part 41*a*; the lower right side in FIG. 18). Then, the guide protrusion 42*a* of the above described first bracket RB1 is slidably inserted into the guide tube 42*b* of the above described second bracket RB2. Note that the guide tube 42*b* and the guide protrusion 42*a* are each mounted to a hinge (not shown; with the above described second pivot axis K2 as the pivot center) provided to the housing 2. Further, a substantially annular rotating part 47*b* equivalent to the above described rotating part 47*a* is mounted rotatably around the above described axis O2 via a bearing (not shown) to the inside (the upper left side in FIG. 18) of the circular part 39*b* of the second bracket RB2.

With the above described structure, when the second roll R2 is in the above described removal position (refer to FIG. 16, etc.), the first bracket RB1 and the second bracket RB2 can be moved relatively close to or away from each other along the above described axis O2 direction by sliding the guide tube 42*b* along the guide protrusion 42*a* inwardly and outwardly. FIG. 18 shows a mode where the second bracket RB2 is moved close to and away from the first bracket RB1, with the state where the second bracket RB2 has been moved close to the first bracket RB1 indicated by the solid lines, and the state where the second bracket RB2 has been moved away from the first bracket RB1 indicated by the imaginary lines. On the other hand, when the second roll R2 is in the above described use position (refer to FIG. 17, etc.), the first bracket RB1 and the second bracket RB2 are in the above described close state and stored inside the second storage part 6 of a narrow width as previously described, and cannot be moved close to or away from each other along the above described axis O2 direction of the second roll R2.

Further, a substantially C-ring shaped interlocking groove 43 is provided to the radial center of the above described circular parts 39*a* and 39*b* of the first bracket RB1 and the second bracket RB2. In the above described use position (the position shown in FIGS. 1-4 and FIG. 17, for example), the above described interlocking groove 43 interlocks with an interlocked shaft (not shown) provided to the housing 2. Then, in this use position, a driven gear (not shown) provided to the above described first bracket RB1 interlocks with a drive transmitting gear provided to the front side of the housing 2 (this interlocked state is shown in FIG. 17). The driven gear of this first bracket RB1 operates in coordination with the above described rotating part 47*a* by a connecting gear mechanism (not shown) provided to the inside of the first bracket RB1. Further, the above described drive transmitting gear operates in coordination with an output shaft of the above described take-up motor M3 via a gear mechanism 44 (refer to FIG. 2) provided near the second storage part 6 on the front side of the housing 2. As a result, in the above described use position, the driving force generated by the take-up motor M3 is transmitted to the above described rotating part 47*a* via the gear mechanism 44, the above described drive transmitting gear, and the driven gear, thereby rotationally driving the second roll R2 mounted to the above described rotating part 47*a* as described later. Accordingly, the first bracket RB1, in the above described use position, can transmit the driving force of the take-up motor M3 to the second roll R2.

Core Member

Hence, as previously described, the above described second roll R2 is generated by the winding of the adhesive tape 152, 153 with print on the outer peripheral side of the above described core member 45. Then, with the core member 45 rotatably supported by the above described first bracket RB1 and the second bracket RB2, the second roll R2 is rotatable inside the second storage part 6. The following described the details thereof.

Figure 19A:
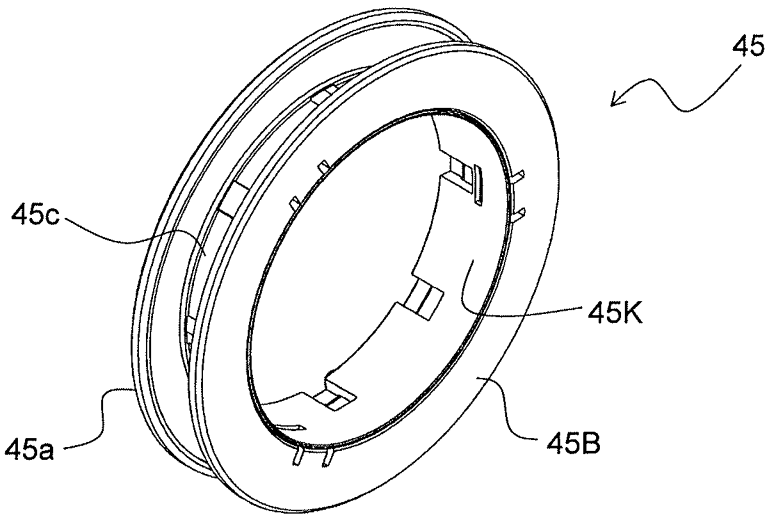
FIG. 19A is an outer appearance perspective view showing an example of the core member for generating the second roll.
Figure 19B:
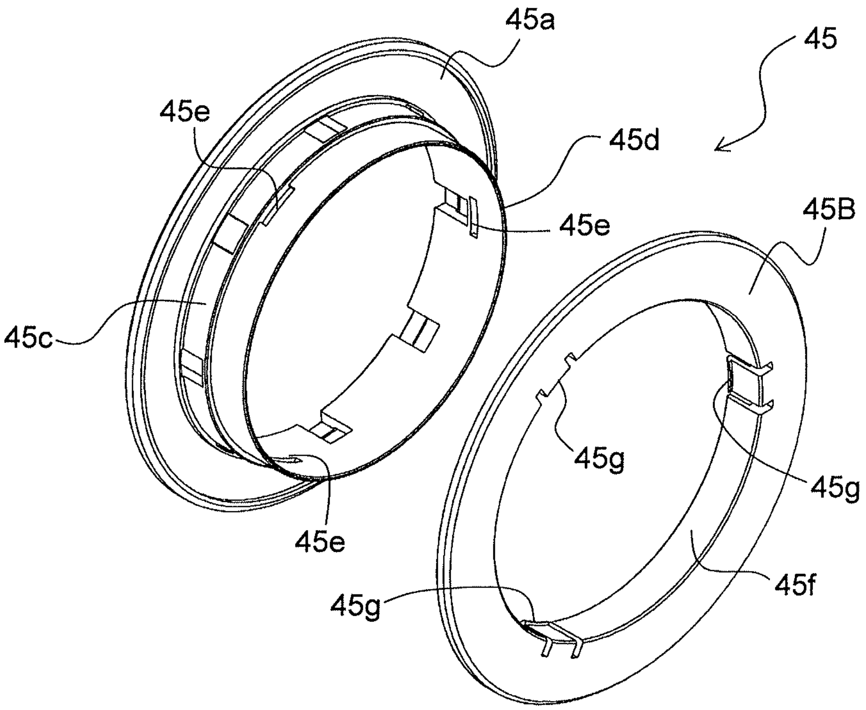
FIG. 19B is an exploded perspective view showing an example of the core member for generating the second roll.

In FIG. 19A and FIG. 19B, the core member 45 in this example is designed with a split structure, comprising a substantially annular flange 45*a* integrally formed with a cylindrical part 45*c* formed into a substantially cylindrical shape and an axial end side of the cylindrical part 45*c* (the upper left side in FIG. 19A), and a substantially annular flange 45*b* provided to the other axial end side (the lower right side in FIG. 19A) of the above described cylindrical part 45*c*.

The above described cylindrical part 45*c* is integrally formed in this example to the one flange 45*a*. An extending part 45*d* designed with a slightly smaller diameter than the cylindrical part 45*c* is provided to one axial side end (the lower right side in FIG. 19) of the cylindrical part 45*c*. Further, a plurality (three in this example) of locking holes 45*e* is formed at regular intervals around the extending part 45*d*. An extending part 45*f* comprising an inner diameter that is the same as the outer diameter of the above described cylindrical part 45*c* and interlocks on the outside of the above described extending part 45*d* is provided from the inner periphery of the other flange 45*b* toward one side. A plurality (three in this example) of locking pieces 45*g* is formed at regular intervals correspondingly with the above described locking holes 45*e* around this extending part 45*f*.

Then, the extending part 45*f* is interlocked with the above described extending part 45*d* on the outside and the locking pieces 45*g* engage with the locking holes 45*e*, thereby forming the above described core member 45 of a bobbin (or drum) shape. Then, the core member 45 in the assembled state as shown in FIG. 19A is mounted to the outer peripheral side of the rotating part 47*a* while an inner periphery surface 45*k* of the above described cylindrical part 45*c* is joined to the above described protrusion 47*k* of the rotating part 47*a* of the above described first bracket RB1. With this arrangement, in the above described use position, the driving force generated from the above described take-up motor M3 and transmitted to the above described rotating part 47*a* via the above described driven gear is transmitted to the second roll R2, rotationally driving the second roll R2. Note that, during the above described mounting, the end part of the second roll R2 on the side opposite the first bracket RB1 contacts the above described rotating part 47*b* of the second bracket RB2. The above described rotating part 47*b* is freely rotatable with respect to the circular part 39*b* as previously described, and rotates in a following manner along with the second roll R2 driven as described above.

Note that the width direction dimension of the above described cylindrical part 45*c* substantially corresponds to the width of the above described adhesive tape 152, 153 with print. The example shown in the above described FIG. 17 is an example of a case where the width of the adhesive tape 152, 153 with print is relatively large, and the example shown in FIG. 19 is an example of a case where the width of the adhesive tape 152, 153 with print is relatively small.

Step-Shape of Core Member

According to this embodiment, it is also possible to further improve the take-up performance of the above described adhesive tape 152, 153 with print by devising a transverse cross-sectional shape of the above described core member 45. The following describes an example of such the core member 45 with reference to FIG. 20 and FIG. 21.

In FIG. 20, the core member 45 in this example, similar to that previously described, is supported by the support bracket RB and takes up and layers (refer to the arrow of the rotating direction) the adhesive tape 152, 153 with print while rotating, thereby generating the above described second roll R2. At that time, as shown in FIG. 21A, for example, a side wall surface 61 of a flat circular plate shape is provided to one side and the other side of the core member 45 in the axial direction as shown in FIG. 21A, for example, resulting in the possibility that, when the adhesive tape 152, 153 with print are sequentially introduced to and layered in the space (comprising a width direction dimension that is substantially the same as the tape width) between these side wall surfaces 61 and 61, the adhesive layer 152 may stick to the above described side wall surface 61 in a wide surface area of the contact part range when the adhesive tape 152, 153 with print shift in position in the width direction prior to introduction, causing difficulties in subsequent tape take-up and, as a result, winding disruption.

Figure 20B:
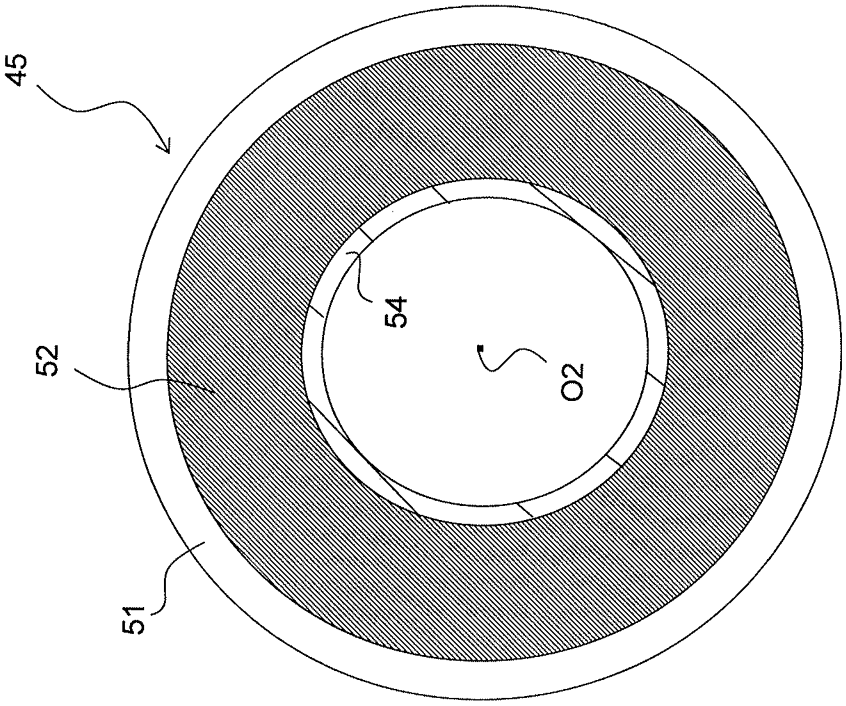
FIG. 20B is a cross-sectional view of the X-X cross-section in FIG. 20A.
Figure 20A:
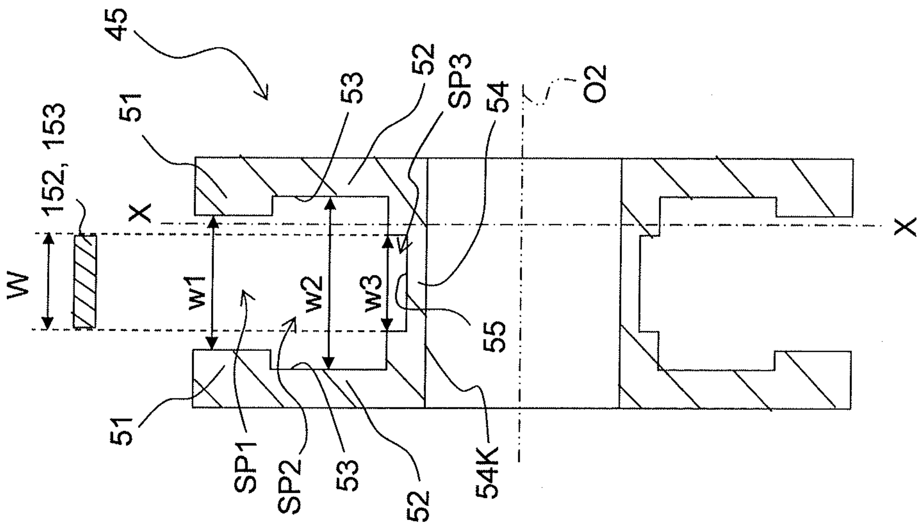
FIG. 20A is a transverse sectional view showing another example of the core member.

Hence, in this example, as shown in FIG. 20A, FIG. 20B, and FIG. 21B, the side wall surface structure is not flat shaped as described above, but rather step-shaped. That is, in the core member 45 of this example, a pair of introduction wall parts 51 and 51 is provided facing each other on one side and the other side in the axial direction of the above described axis O2 (on the left side and the right side in FIG. 20A). Then, these introduction wall parts 51 and 51 are formed with a space SP1 comprising a dimension w1 in the axial direction that corresponds to a tape width W of the adhesive tape 152, 153 with print therebetween. With this arrangement, when the above described adhesive tape 152, 153 with print subject to take-up are introduced from the radial outside of the core member 45 to the core member 45, it is possible to smoothly introduce the adhesive tape 152, 153 with print while positioning and guiding them with high accuracy in the width direction.

Further, a pair of middle wall parts 52 and 52 is provided further on the radial inside than the pair of introduction wall parts 51 and 51, facing each other on one side and the other side in the above described axial direction. These middle wall parts 52 and 52 are formed by concave parts 53 and 53 that respectively cave in further on either axial end side (the left side or right side in FIG. 20A) than the introduction wall parts 51 and 51, with a space SP2 comprising an axial direction dimension w2 (functioning as a tape relief width) wider than the above described dimension w1 therebetween.

Furthermore, an inner cylindrical surface 54 is provided further on the radial inside than the above described pair of middle wall parts 52 and 52, in an extended manner in an axial direction so as to connect the radial inside ends of the pair of middle wall parts 52 and 52. The inner cylindrical surface 54 is an area for sequentially affixing and winding the adhesive tape 152, 153 with print introduced via the above described introduction wall part 51 and the above described middle wall part 52. The inner cylindrical surface 54 comprises a concave groove 55 of a dimension w3 in the axial direction that is substantially equal to the tape width W of the adhesive tape 152, 153 with print. Note that an inner peripheral surface 54*k* that is on the side opposite the concave groove 55 of the inner cylindrical surface 54 fulfills the same function as the aforementioned inner peripheral surface 45*k*. That is, the core member 45 in this example is mounted to the outer peripheral side of the rotating part 47*a* while the above described inner peripheral surface 54*k* is joined to the above described protrusion 47*k* of the rotating part 47*a* of the aforementioned first bracket RB1.

Note that, as shown in FIG. 20B, the axial direction dimension of the above described middle wall part 52 inserted between the introduction wall part 51 and the inner cylindrical surface 54 (concave groove 55) is greater than the axial direction dimension of the introduction wall part 51 as well as the axial direction dimension of the inner cylindrical surface 54. Note that the size relationship of the above described axial direction dimensions of the above described introduction wall part 51, the middle wall part 52, and the inner cylindrical surface 54, respectively, is w3 (≈W)<w1 and w1<w2.

As described above, in the core member 45 shown in FIG. 20A, FIG. 20B, and FIG. 21, the space SP2 of the dimension w2 wider than the space SP1 of the dimension w1 formed by the introduction wall parts 51 and 51 is formed by the concave parts 53 and 53 of the middle wall parts 52 and 52. With this arrangement, when the adhesive tape 152, 153 with print introduced from the introduction wall part 51 are sequentially wound on the inner cylindrical surface 54 as described above, both ends of the adhesive tape 152, 153 with print in the width direction are in a positional relationship where they respectively separate from the above described middle wall parts 52 and 52, thereby making it difficult for sticking to occur by contact. Further, even if both width direction ends of the adhesive tape 152, 153 with print were to make contact and stick, the area to which they would stick would mainly be the introduction wall part 51 only and not the above described middle wall parts 52 and 52. Accordingly, compared to a case where the side wall surface 61 of the aforementioned flat, circular plate shape shown in FIG. 21A is provided, the surface area of the sticking caused by contact is extremely small. As a result, even if sticking temporarily occurs, the sticking to the introduction wall part 51 is once again peeled by the subsequent rotation (refer to the white arrow in FIG. 21B) of the above described core member 45, making it possible to properly guide and affix the adhesive tape 152, 153 with print to the inner cylindrical surface 54.

Note that the core member 45 of this example shown in FIG. 20A, FIG. 20B, and FIG. 21B differs from the one previously described with reference to FIG. 19A and FIG. 19B, and does not necessarily require a divided structure. Nevertheless, the core member 45 may be combined with the divided structure shown in FIG. 19A and FIG. 19B.

Cartridge Release Processing Part

Hence, a release processing part for temporarily tacking (reseparably adhering) the adhesive tape 152, 153 with print generated by the cutting process by the aforementioned cutter mechanism 14 is provided to the aforementioned adhesive tape cartridge TK. This release processing part will now be described with reference to FIG. 22, etc.

Figure 22:
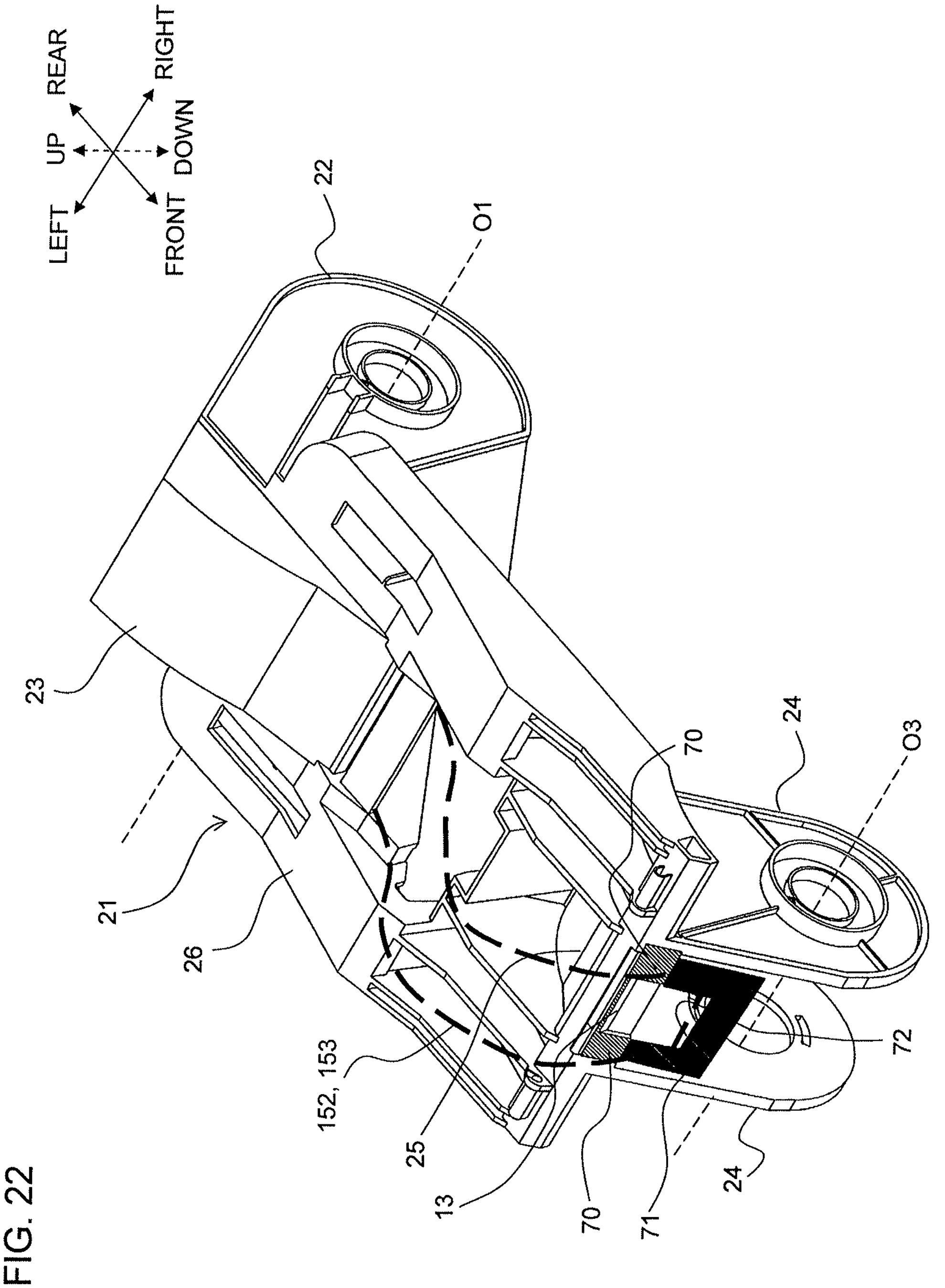
FIG. 22 is a perspective view showing the connecting arm extracted from the adhesive tape cartridge.

In FIG. 22 and the aforementioned FIG. 9, etc., as already described, the first roll R1 and the third roll R3 are connected by the connecting arm 21 of a cross-sectional shape that is substantially box-like with an open left side, with the first roll R1 freely rotatably supported on the rear side, and the third roll R3 freely rotatably supported on the front side. Then, at the peeling part 13, the separation material layer 151 is peeled from the print-receiving adhesive tape 150 fed out from the first roll R1, generating the adhesive tape 152, 153 with print.

When the adhesive tape 152, 153 with print are cut by the cutter mechanism 14 as previously described, the user may, for example, remove and move the adhesive tape cartridge TK from the housing 2, etc. The adhesive layer 152 of the above described adhesive tape 152, 153 with print at this time is exposed by the peeling of the separation material layer 151 from the print-receiving adhesive tape 150. Accordingly, when the user carelessly performs handling during the above described removal and moving, the leading edge of the adhesive tape 152, 153 with print after the above described cutting as well as the adhesive layer 152 positioned nearby may mistakenly self adhere to another area of the adhesive tape 152, 153 with print or stick to the third roll R3 or another cartridge area as is.

Hence, in this embodiment, a release processing part 70 configured to reseparably adhere the above described adhesive tape 152, 153 with print is provided to the position of the peeling part 13 of the above described connecting arm 21 (in this example, the shaded section in a substantial sideways "C" shape shown in FIG. 22). Note that examples of the release processing part 70 include provision of a release processing member that is a separate member from the connecting arm 21 or formation of a release processing area by executing a predetermined release process at the area of the connecting arm 21.

Further, according to this embodiment, a rectangular cover member 71 that hangs down in a canopy shape from the position of the peeling part 13 is further provided to cover an area of the third roll R3 on the side of the adhesive tape 152, 153 with print generated by the peeling part 13. Release processing similar to the above described release processing part 70 is performed on the entire surface (or a part of the surface) of this cover member 71. With this arrangement, the cover member 71 is capable of reseparably adhering the adhesive layer 152 positioned on the lower side of the adhesive tape 152, 153 with print discharged from the peeling part 13 to the surface of the cover member 71.

Further, a hole 72 comprising a width direction dimension that is smaller than the width of the adhesive tape 152, 153 with print is provided to the cover member 71. The adhesive tape 152, 153 with print are reseparably adhered across both sides of the hole 72 along the tape length direction. When the above described adhesive tape 152, 153 with print adhere across this hole 72 comprising a small width direction dimension as described above, the user can access the adhesive tape 152, 153 with print exposed on the third roll R3 side by operation with a finger.

Note that, in a case where there is no possibility of sticking to the third roll R3 side (or in a case where no such considerations need be made), the cover member 71 may be omitted.

Note that the above described release processing part 70 and cover member 71 are shown only in FIG. 22 to prevent complexities in illustrations, and illustrations thereof in other figures are omitted.

Switching the Path of the Adhesive Tape with Print

Figure 24:
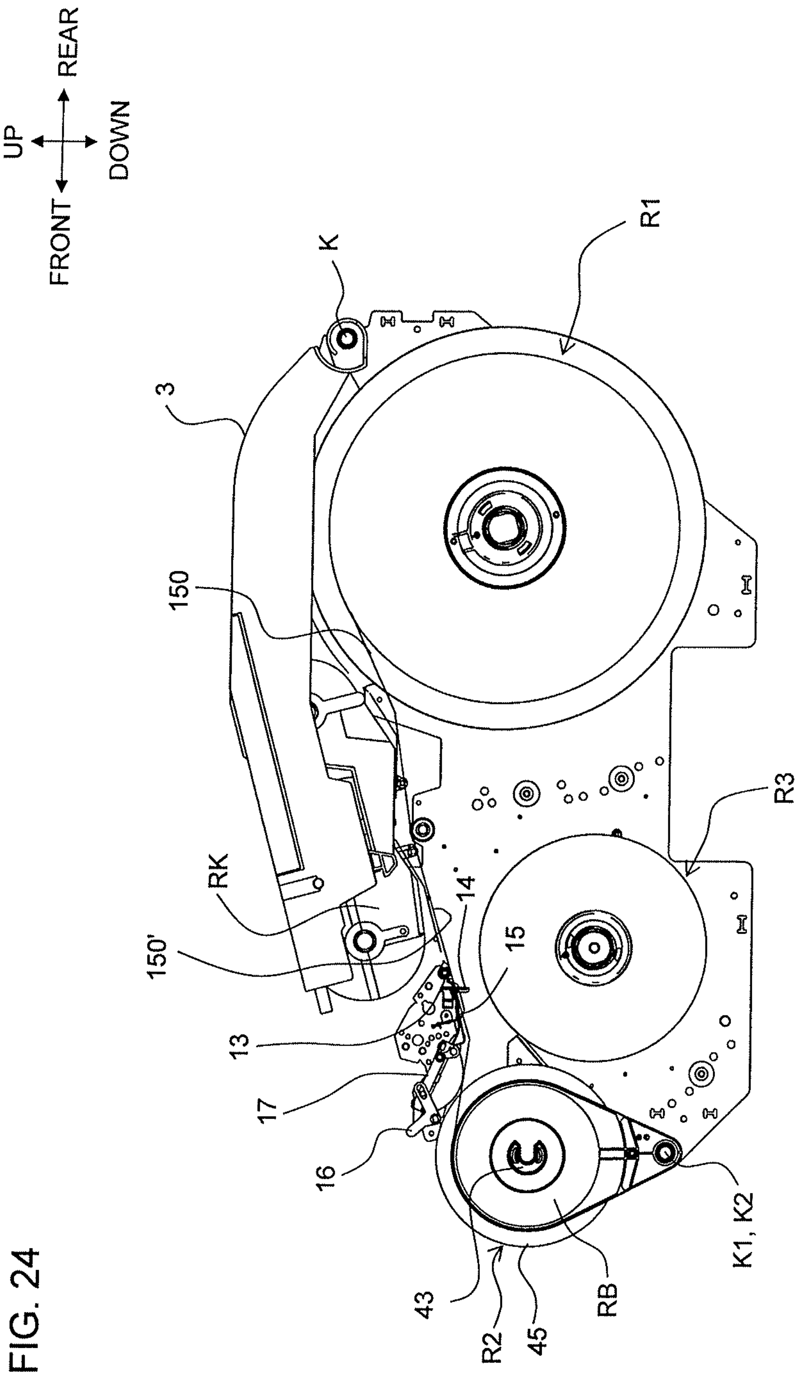
FIG. 24 is an explanatory view showing the tape feeding path of the state shown in FIG. 23B.
Figure 25:
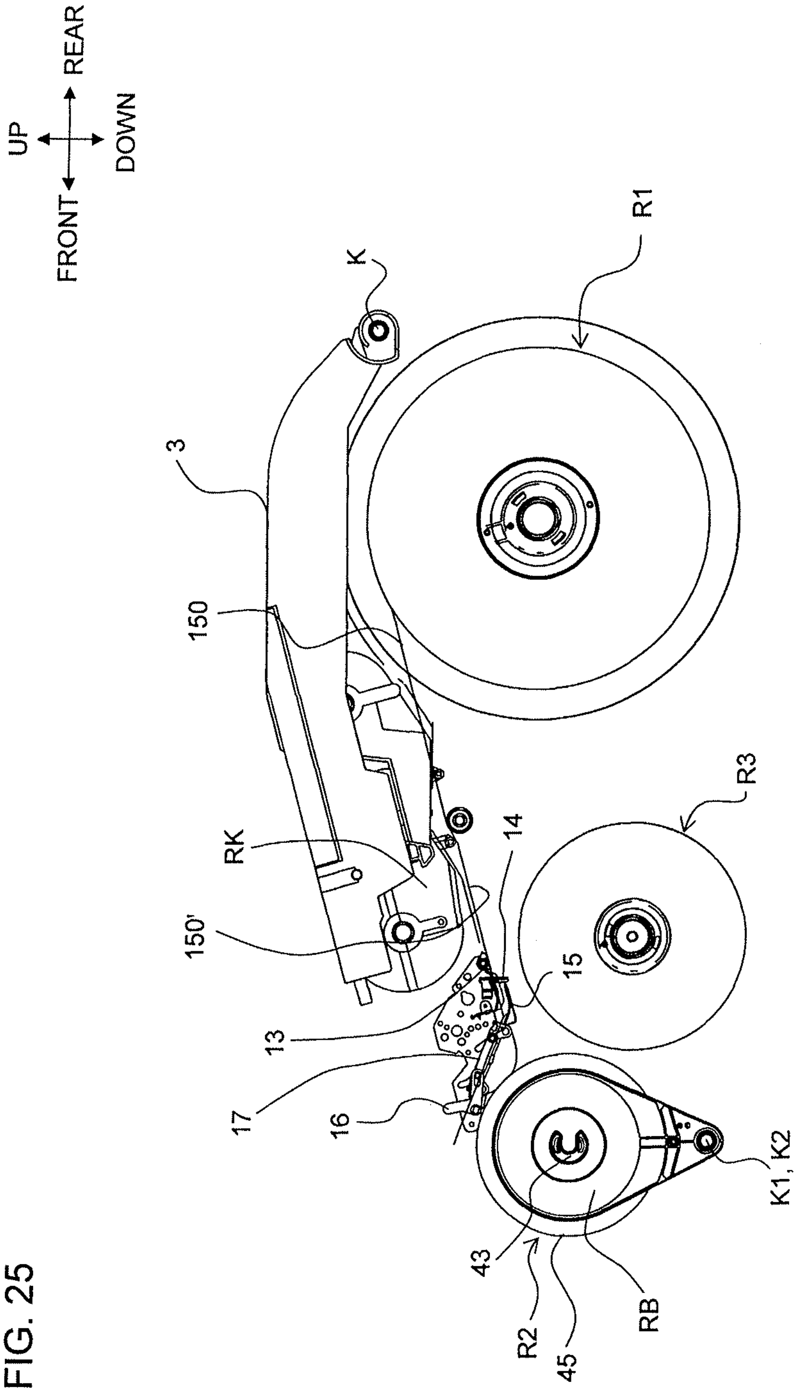
FIG. 25 is an explanatory view showing the tape feeding path of the state shown in FIG. 23C.

As already described, according to this embodiment, the shoot 15 for switching the feeding path of the adhesive tape 152, 153 with print (or sometimes the adhesive tape 150' with print which includes the separation material layer 151; described later) between the side toward the second roll R2 and the side toward the discharging exit 12 is provided further on the downstream side than the cutter mechanism 14 along the tape transport direction. The path switching of this shoot 15 will now be described with reference to FIGS. 23-25, etc.

According to this embodiment, the feeding of the adhesive tape 152, 153 with print or the adhesive tape 150' with print (hereinafter suitably and simply referred to as the "adhesive tape 152, 153 with print, etc.") is generally classified into two modes according to whether or not there is winding of the second roll R2 inside the second storage part 6, and can be switched to three modes by further switching the above described shoot 15.

Switching Details of Shoot

First, the switching of the shoot 15 will be described. The above described shoot 15 is provided further on the upstream side along the feeding path than the second roll R2 stored in the second storage part 6, and further on the downstream side along the feeding path than the print head 10. This shoot 15 is configured to be selectively switchable between an upper position (corresponding to a regular feeding mode described later) that guides the feeding path of the adhesive tape 152, 153 with print, etc., to the second storage part 6, and a lower position (corresponding to a feeding mode for external discharge described later) that guides the feeding path of the adhesive tape 150' with print (in which the separation material layer 151 is not separated but included) to the discharging exit 12 of the housing 2.

Figure 23A:
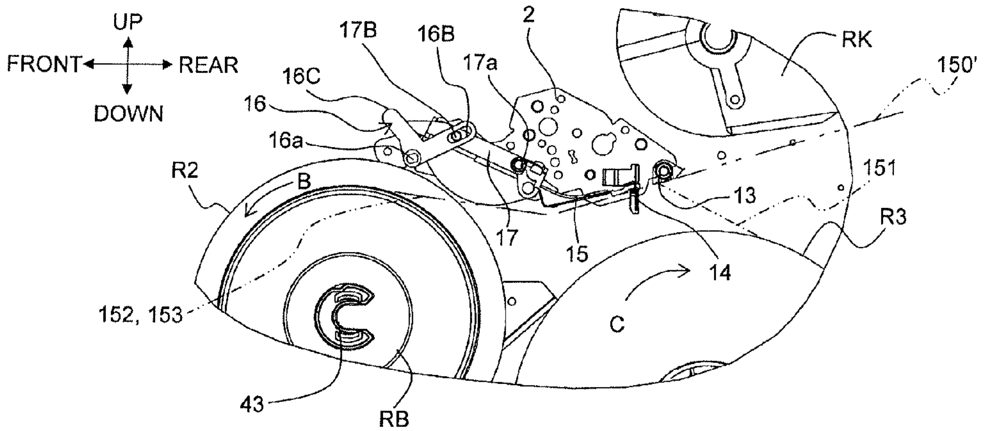
FIG. 23A is an explanatory view showing the behavior when the second roll is generated by the adhesive tape with print while the separation material layer is peeled, with the shoot switched to the first switching state.
Figure 23B:
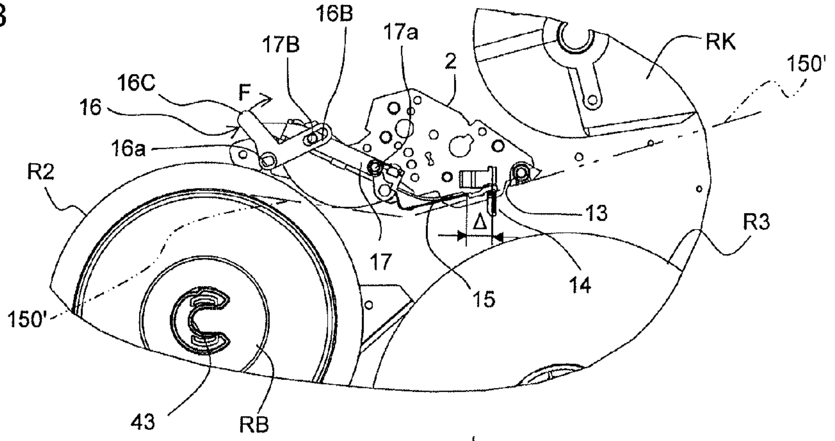
FIG. 23B is an explanatory view showing the behavior when the second roll is generated by the adhesive tape with print without the separation material layer peeled, with the shoot switched to the first switching state.
Figure 23C:
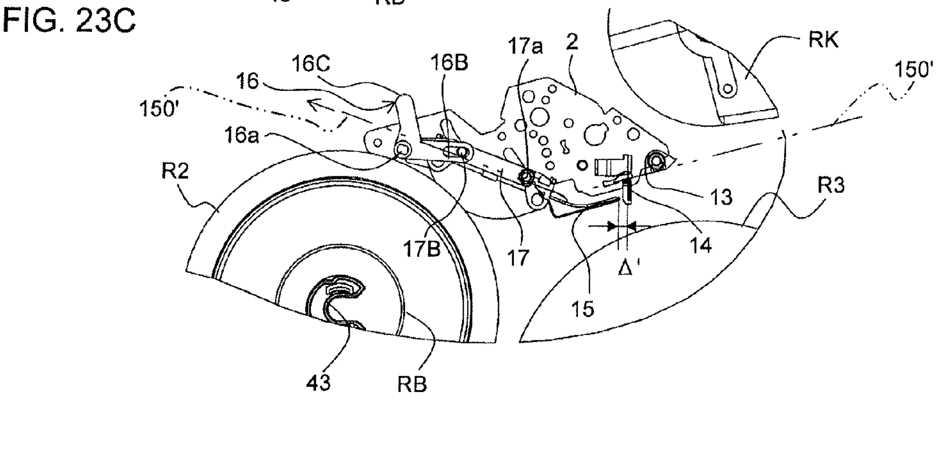
FIG. 23C is an explanatory view showing the behavior when the adhesive tape with print is discharged in a tape state without the separation material layer peeled, with the shoot switched to the second switching state.

The switching of the position of this shoot 15 is specifically performed by a switching lever 16, as shown in FIGS. 23A-23C. That is, a slide arm 17 is provided to the housing 2 in a slidable manner in the downward sloping direction on the rear side. The above described shoot 15 of a substantially L-shaped transverse cross-section is provided to a fulcrum shaft 17A provided on the rear side of this slide arm 17 so that the L-shaped horizontal part faces the cutter mechanism 14 side.

Further, a hinge protrusion 17B that serves as an action point is formed on the front side of the slide arm 17. The above described switching lever 16 at this time is formed into a substantial L-shape, and is provided in a back-and-forth rockable manner to the housing 2 by the fulcrum shaft 16A positioned in a middle section thereof. A long hole 16B is formed on the rear side of the switching lever 16, and the hinge protrusion 17B of the slide arm 17 is fit to this long hole 16B so that there is play therebetween.

With the above described configuration, the slide arm 17 moves when the user operates an upward extending operation part 16C of the switching lever 16 in direction F in FIG. 23B, switching the shoot 15 from the upper position shown in FIG. 23A and FIG. 23B to the lower position shown in FIG. 23C. Further, if the operation part 16C is operated in the reverse of the above described F direction, the shoot 15 is switched from the lower position shown in FIG. 23C to the upper position shown in FIG. 23A and FIG. 23B.

Switching the Feeding Path

Next, the three feeding paths realized by the presence or non-presence of the winding of the second roll R2 described above and the switching of the above described shoot 15 will be described in order.

That is, first, the regular representative feeding mode performed with the shoot 15 switched to the above described upper position is the feeding mode already described. That is, as shown in FIG. 23A, while the separation material layer 151 of the adhesive tape 150' with print is peeled to form the third roll R3 inside the third storage part 7, the adhesive tape 152, 153 with print from which the separation material layer 151 was peeled are wound inside the second storage part 6, forming the second roll R2.

Note that the regular feeding mode performed with the shoot 15 switched to the above described upper position as described above is also sometimes configured so that the third roll R3 is not made to function. In such a case, as shown in FIG. 23B, the adhesive tape 150' with print is wound as is inside the second storage part 6 without peeling the separation material layer 151 (that is, with the separation material layer 151 included as is), thereby forming the second roll R2. In order to make the third roll R3 not function, the separation material layer 151 included in the adhesive tape 150' with print and the third roll R3 are not connected (in this case, the third roll R3 serves as a so-called dummy) or the third roll R3 itself is not mounted to the adhesive tape cartridge TK.

On the other hand, in a case where the shoot is switched to the above described lower position (in this case, the third roll R3 is made not to function as described above), the mode changes to the feeding mode for external discharge. In this case, the adhesive tape 150' with print is discharged in a tape mode from the discharging exit 12 (refer to FIG. 2, FIG. 16, and FIG. 17 as well) provided to the housing 2 to the outside of the housing 2 as is, without being guided to the second storage part 6 and wound into a roll shape and without the separation material layer 151 being peeled (in this case, the second storage part 6 is not used, for example).

Note that the switching of the above described shoot 15 is performed before winding work (or discharging work) of the above described adhesive tape 152, 153 with print, etc., is newly performed, that is, with tape feeding stopped. During that switching, the tape leading edge of the adhesive tape 152, 153 with print, etc., cut during the previous winding work (or discharging work) is stopped at the position of the above described cutter mechanism 14. Correspondingly, according to this embodiment, when the shoot 15 is switched from the above described upper position to the lower position, the leading edge position of the shoot 15 is configured to be closer to the side near the cutter mechanism 14 side (one side). That is, in the upper position shown in FIG. 23A and FIG. 23B, a relatively large space A forms between the rear side leading edge position of the shoot 15 and the cutter mechanism 14. Conversely, in the lower position shown in FIG. 23C, a space Δ' smaller than the above described Δ forms between the rear side leading edge position of the shoot 15 and the cutter mechanism 14 when the shoot 15 is switched to the lower position.

As described above, in this embodiment, in the flow of the print-receiving adhesive tape 150 and the adhesive tape 150' with print (the adhesive tape 152, 153 with print and the separation material layer 151) from the first storage part 5, through print formation by the print head 10, to the third storage part 7 and the second storage part 6, etc., the feeding by the feeding roller 11 is all performed with a tape posture in which the tape width direction is set to the left-right direction, in other words, with the tape surface turned sideways. That is, the first roll R1, the second roll R2, and the third roll R3 are respectively wound around the axes O1, O2, and O3 in the substantially horizontal direction. Then, the first storage part 5 configured to store the first roll R1 is disposed on the rear side of the housing 2, the print-receiving adhesive tape 150 from the first roll R1 is fed toward the front side of the housing 2, and the adhesive tape 150' with print after print formation is guided toward the second storage part 6, the third storage part 7, etc., provided on the front side of the housing 2. The feeding path when the adhesive tape 150' with print is formed from the print-receiving adhesive tape 150 is thus a feeding path from the rear side to the front side of the housing 2. Further, the first roll R1, the second roll R2, and the third roll R3 are so-called drop-in types that are respectively inserted from above and stored in the corresponding first storage part 5, the second storage part 6, and the third storage part 7. Moreover, the feeding motor M1 for driving the feeding roller 11 is provided in the middle of the first storage part 5 and the second storage part 6, which are disposed in a divided manner into a rear side and a front side as previously described. With such a configuration of each component, in the adhesive tape printer 1 of this embodiment, it is possible to design the housing 2 which contains each of the above described components with a narrow width shape comprising a long dimension in the front-rear direction, and a short dimension in the left-right direction (refer to FIG. 8). As a result, it is possible to decrease the space required for providing the adhesive tape printer 1.

Further, the first opening/closing cover 3 capable of opening and closing the first storage part 5, and the second opening/closing cover 4 capable of opening and closing the second storage part 6 are provided to the upper part of the housing 2. Then, the first storage part 5 can be exposed by opening the first opening/closing cover 3 provided to the rear end of the housing 2, and the second storage part 6 can be exposed by opening the second opening/closing cover 4 provided to the front end of the housing 2. That is, it is possible to individually and independently expose the first storage part 5 and the second storage part 6, respectively. With this arrangement, when the adhesive tape 150' with print is wound inside the second storage part 6, forming the second roll R2, for example, it is also possible to open the second opening/closing cover 4 based on suitable timing and remove and use the second roll R2 wound inside the second storage part 6, regardless of the consumed state of the print-receiving adhesive tape 150 of the first roll R1 inside the first storage part 5. Thus, it is possible to improve user convenience.

Further, in particular, according to this embodiment, during printing execution, the first roll R1 and the third roll R3 are stored and used in the first predetermined position 8 below the first opening/closing cover 3 for each of the adhesive tape cartridges TK. With this arrangement, the user can simply attach and detach these two rolls R1 and R3 and perform other handling collectively, thereby making it possible to improve convenience.

Further, in particular, according to this embodiment, the ink ribbon IB used for printing is stored and used in the second predetermined position 9 below the first opening/closing cover 3 and above the adhesive tape cartridge TK for each of the above described ribbon cartridges RK. With this arrangement, the user can simply perform the handling of the ink ribbon IB required during print formation separately from the adhesive tape cartridge TK, thereby making it possible to improve convenience.

Further, in particular, according to this embodiment, the structure of the aforementioned first opening/closing cover 3 and the second opening/closing cover 4 makes it possible to replace the ribbon cartridge RK based on suitable timing by opening the first opening/closing cover 3, regardless of the winding and layering state of the adhesive tape 152, 153 with print of the second roll R2. With this arrangement, when the adhesive tape 152, 153 with print are wound to the second roll R2, the ribbon cartridge RK, for example, can be replaced in the middle of the process to change the print color, etc., thereby making it possible to further improve convenience.

Further, in particular, according to this embodiment, the second roll R2 can be attached to and detached from the second storage part 6 by opening the second opening/closing cover 4, even with the first opening/closing cover 3 in a closed state as is. With this arrangement, even in a case where the print-receiving adhesive tape 150 of the first roll R1 is barely consumed and replacement of the first roll R1 is not yet required, the user can open the second opening/closing cover 4 based on suitable preferred timing and reliably remove the second roll R2 with the first roll R1 left inside the first storage part 5 as is. Thus, it is possible to further improve convenience.

Further, in particular, according to this embodiment, the height direction position of the axis O2 of the second roll R2 configured to wind the adhesive tape 152, 153 with print inside the second storage part 6 is higher than the height direction position of the axis O3 of the third roll R3 configured to wind the separation material layer 151 inside the third storage part 7 by an amount equivalent to the distance h. With this arrangement, it is possible to reliably peel the separation material layer 151 downward from the adhesive tape 150' with print fed to the front side as previously described, and reliably introduce the remaining adhesive tape 152, 153 with print separated from the separation material layer 151 to the second storage part 6 without interference with the third roll R3. Further, due to the above described positional relationship, it is possible to apply sufficient tensile force to pull the adhesive tape 152, 153 with print tight after the peeling of the separation material layer 151, between the peeling position of the separation material layer 151 and the outer peripheral part of the second roll R2 wound to the second roll R2 inside the second storage part 6. As a result, it is possible to smoothly and favorably perform the cutting by the above described cutter mechanism 14.

Further, according to the adhesive tape cartridge TK provided in this embodiment, in a case where the separation material layer 151 is peeled from the adhesive tape 150' with print generated from the print-receiving adhesive tape 150 and used, the first roll R1 around which is wound the print-receiving adhesive tape 150 and the third roll R3 around which is wound the separation material layer 151 peeled as described above are integrated via the connecting arm 21. With this arrangement, the user can simply attach and detach these two rolls to and from the adhesive tape printer 1 side and perform various handling collectively, making it possible to improve convenience. The guide parts 27 provided to the connecting arm 21 at this time substantially contact both tape width direction ends and guide the print-receiving adhesive tape 150 while causing the print-receiving adhesive tape 150 to pass with its tape width direction set to the left-right direction. With this arrangement, it is possible to reliably perform smooth tape feeding. As a result of the above, it is possible to improve the handling performance by the user and ensure smooth feeding.

Further, in particular, according to this embodiment, it is possible to smoothly and reliably peel the separation material layer 151 from the print-receiving adhesive tape 150 fed out from the first roll R1 and fed toward the front side by the peeling part 13 provided further on the downstream side than the guide part 27, along the tape feeding path.

Further, in particular, according to this embodiment, the feed-out of the print-receiving adhesive tape 150 and the take-up of the separation material layer 151 are performed while the first roll R1 and the third roll R3 rotate in mutually opposite directions (in direction A, i.e., the counterclockwise direction, in FIG. 3, and in direction C, i.e., the clockwise direction, in FIG. 3, respectively). At this time, in a case where the third roll R3 rotates in the same counterclockwise direction as the first roll R1, for instance, the separation material layer 151 is brought onto the roll outer peripheral part in the substantially same direction (substantially leftward in FIG. 3, for example) as the transport direction (leftward in FIG. 3, for example) of the print-receiving adhesive tape 150 fed out and fed from the first roll R1. Nevertheless, according to this embodiment, with the third roll R3 configured to rotate in the clockwise direction as described above, the separation material layer 151 is brought onto the roll outer peripheral part (refer to arrow C in FIG. 3) in the direction (substantially rightward in FIG. 3, for example) substantially opposite the transport direction (leftward in FIG. 3, for example) of the print-receiving adhesive tape 150 fed out and fed from the first roll R1. With this arrangement, the angle 0 (refer to FIG. 11) at which the separation material layer 151 bends when peeled from the print-receiving adhesive tape 150 fed to the front side is a small angle (an acute angle in this example) compared to a case where the above described two rolls R1 and R2 both rotate in the clockwise direction. As a result, it is possible to smoothly and reliably perform the peeling of the separation material layer 151 from the fed print-receiving adhesive tape 150.

Further, in particular, according to this embodiment, the connecting arm 21 of the adhesive tape cartridge TK, with the aforementioned configuration (the first bracket parts 22 and 22, the second bracket parts 24 and 24, the first connecting part 23, the second connecting part 25, and the roll connecting beam parts 26 and 26) is designed with the required minimum structure for connecting and integrating the first roll R1 around which is wound the print-receiving adhesive tape 150 and the third roll R3 around which is wound the peeled separation material layer 151 while supporting these in a rotatable manner. With this arrangement, it is possible to set each of the rolls R1 and R3 in a largely exposed state in an area other than the connecting arm 21 of the adhesive tape cartridge TK. As a result, it is possible to simplify and lighten the structure of the overall adhesive tape cartridge TK.

Further, according to the adhesive tape cartridge TK provided in this embodiment, the mutual relationship between the position of the above described peeling part 13 and the take-up position WP to the third roll R3 when the separation material layer 151 is peeled and taken up as described above is set so that favorable peeling is performed as previously described. Specifically, the position of the peeling part 13 in the above described predetermined direction (direction of arrow A-B in FIG. 12) is set further on one side (arrow A side) than the above described take-up position WP when the third roll R3 is in a minimum outer diameter state (solid line state), at least. With this arrangement, when the separation material layer 151 is peeled at the peeling part 13 from the adhesive tape 150' with print fed on the middle feeding path FP to one side (arrow A direction) along the above described predetermined direction (arrow A-B direction), the separation material layer 151 bends toward the arrow B direction, which is the other side in the above described predetermined direction, at an acute angle (the above described angle θ) smaller than 90°, at least. As a result, compared to a case where the separation material layer 151 is simply bent 90° directly horizontal and peeled, it is possible to sufficiently and reliably peel the separation material layer 151.

Note that the position of the above described predetermined direction (arrow A-B direction) of the peeling part 13 may be set further on the above described one side (arrow A side) than the axis O3 of the third roll R3. In this case, the separation material layer 151 bends at an even smaller angle when peeled at the above described peeling part 13, making it possible to more reliably sufficiently peel the separation material layer 151.

Figure 12B:
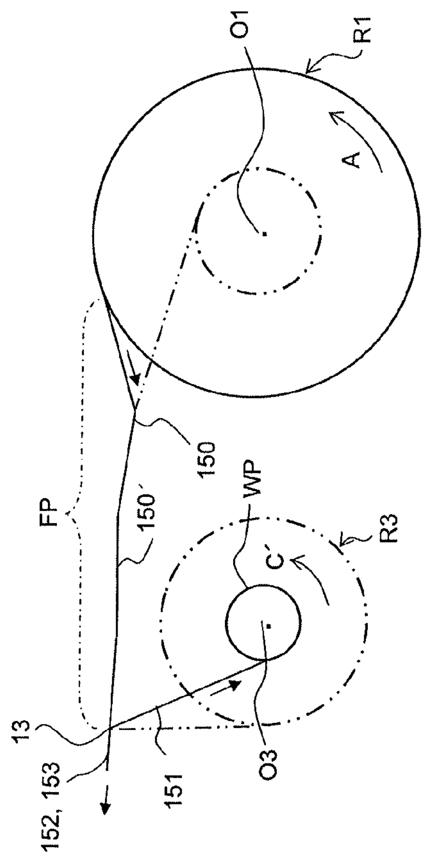
FIG. 12B is an explanatory view showing the behavior of each roll of the adhesive tape cartridge, in the rotating direction and on the tape feeding path.

Further, in particular, according to this embodiment, the first roll R1 feeds out the print-receiving adhesive tape 150 from the outer peripheral part while rotating in the above described counterclockwise direction, as already described. On the other hand, the third roll R3 brings in and takes up the separation material layer 151 peeled by the peeling part 13 on the roll outer peripheral part in a direction substantially opposite the transport direction of the print-receiving adhesive tape 150 while rotating in the above described clockwise direction. With this arrangement, it is possible to reasonably and smoothly wind the separation material layer 151 acutely bent at an acute angle as previously described. Further, in a case where the third roll R3 rotates in the same direction (that is, the aforementioned counterclockwise direction) as the first roll R1 and brings in the separation material layer 151 on the roll outer peripheral part as shown in FIG. 12B, the peeling part 13 needs to be provided further on the front side in order to maintain the above described angle 0 at an acute angle and avoid interference with the first roll R1 and the third roll R3, leading to an increase in size of the adhesive tape cartridge TK. Conversely, in the case of the configuration shown in FIG. 12A, it is possible to avoid the above and provide the peeling part 13 closer to the first roll R1 on the rear side, making it possible to decrease the size of the adhesive tape cartridge TK. Note that, in a case where a decrease in size in this adhesive tape cartridge TK need not be considered, a configuration such as that of the above described FIG. 12B is acceptable.

Further, according to this embodiment, in the cutter mechanism 14, due to the support mode of the above described movable plate support part 33*a*, the movable blade 32 cuts from the adhesive layer 152 of the lowermost layer to the upper layer while the upward-pointing and downward-sloping blade edge 32*a* lifts the adhesive tape 152, 153 with print upward from below as the movable blade 32 travels, as previously described. At that time, the lowermost layer (that is, on the blade edge 32*a* side) and not the uppermost layer of the adhesive tape 152, 153 with print is the adhesive layer 152, making it possible to prevent the adhesive layer from sticking to the guide plate 31 that presses and contacts the upper surface of the adhesive tape 152, 153 with print (in other words, the upper surface of the base layer 153) due to the above described cutting. As a result, the movable blade 32 advances in the tape width direction as the adhesive tape 152, 153 with print are reliably sandwiched and stabilized from above and below by the guide plate 31 and the movable blade 32, making it possible to perform cutting smoothly and sharply.

Further, in particular, in this embodiment, the guide plate 31 comprises the slit 31*a* for guiding the travel of the movable blade 32 by the carriage 33. With this arrangement, during the cutting of the adhesive tape 152, 153 with print, it is possible to reliably and smoothly make the movable blade 32 supported by the guide plate 31 and the carriage 33 travel in the tape width direction.

Further, in this embodiment, the second opening/closing cover 4 pivotable between the above described closed position and the above described open position is provided to the front side of the housing 2. In the above described closed position, the front side of the above described housing 2 is covered by the second opening/closing cover 4, and in the above described open position, the front side of the above described housing 2 is exposed. Then, the above described second roll R2 is rotatably supported via the core member 45 and the support bracket RB in the front side interior of the housing 2. The support bracket RB is pivotably configured between the above described use position, which is on the closed direction side of the above described second opening/closing cover 4, and the above described removal position, which is on the open direction side of the above described second opening/closing cover 4. As a result, it is possible to expose the front side of the housing 2 (refer to FIG. 17) by changing the above described second opening/closing cover 4 from the closed position to the open position, which causes the support bracket RB that supports the second roll R2 to pivot from the above described use position to the above described removal position (refer to FIG. 16).

At this time, the support bracket RB is configured so that the second roll R2 is not attachable or detachable in the above described use position (refer to FIG. 17), and is attachable and detachable in the above described removal position (refer to FIG. 16). Accordingly, when the second opening/closing cover 4 is in the closed state and the front side of the housing 2 is covered, the support bracket RB is in the above described use position, and the above described second roll R2 rotates in a state in which it is not attachable or detachable (refer to FIG. 1, FIG. 2, FIG. 4, etc.). On the other hand, when the second opening/closing cover 4 changes from the closed state to the open state and the front side of the housing 2 is exposed, the support bracket RB pivots from the above described use position to the above described removal position, making the second roll R2 attachable and detachable on the front side of the above described exposed housing 2 (the state shown in FIG. 16, FIG. 5, and FIG. 6).

With the above, in this embodiment, after the adhesive tape 152, 153 with print are wound, forming the second roll R2 as previously described, the user opens the second opening/closing cover 4 based on suitable timing and pivots the support bracket RB to the removal position as described above, making it possible to smoothly and simply remove the wound second roll R2. Further, similar to the above, when the second roll R2 is to be newly mounted as well, the user opens the second opening/closing cover 4 and pivots the support bracket RB to the above described removal position as described above, making it possible for the user to smoothly and simply mount the second roll R2. Further, subsequently the support bracket RB is rotated to the above described use position and the user closes the second opening/closing cover 4, thereby completely printing preparation.

As described above, in this embodiment, in a state where the user has opened the second opening/closing cover 4 to expose the front side interior of the housing 2 and further pivots the support bracket RB to the above described removal position in the open direction of the above described second opening/closing cover 4, the user can attach and detach the second roll R2 to and from the support bracket RB. That is, the user can attach and detach the second roll R2 not inside the internal space of the housing 2 with the second opening/closing cover 4 in a closed state, but outside the space. With this arrangement, a manual operation space for roll attachment and detachment no longer needs to be secured in the interior of the housing 2, making it possible decrease the size of the housing 2. In consequence, according to this embodiment, it is possible to simply attach and detach the second roll R2 around which are wound the adhesive tape 152, 153 with print while preventing an increase in the size of the housing 2.

Further, in particular, in this embodiment, when the support bracket RB is pivoted from the use position to the removal position, it is possible to relatively separate the first bracket RB1 and the second bracket RB2 away from each other as previously described (refer to FIG. 18). As a result, it is possible to attach and detach the second roll R2 between the separated second bracket RB2 and the first bracket RB1.

Further, in particular, in this embodiment, it is possible to pivot the support bracket RB from the removal position to the use position, thereby transmitting the driving force from the take-up motor M3 to the second roll R2 via the driven gear and rotating part 47*a* of the first bracket RB1 as previously described. As a result, it is possible to reliably take up and wind the adhesive tape 152, 153 with print on the second roll R2.

Further, in particular, in this embodiment, the first pivot axis K1 of the second opening/closing cover 4 and the second pivot axis K2 of the support bracket RB are in the same position. With this arrangement, the arc trajectory drawn by each component of the second opening/closing cover 4 when the second opening/closing cover 4 pivots between the above described closed position and the above described open position, and the arc trajectory drawn by each component of the support bracket RB when the support bracket RB pivots between the above described use position and the above described removal position are trajectories of the same center. As a result, it is possible to make interference not readily occur between the second opening/closing cover 4 and the support bracket RB during pivoting. Further, a common shaft member is used by the second opening/closing cover 4 and the support bracket RB at the axes K1 and K2 of the above described same position, thereby making it possible to simplify the structure compared to a case where separate shaft members are used.

Further, in particular, in this embodiment, the cutter mechanism 14 is provided further on the rear side (that is, the upstream side along the feeding path) than the second roll R2, and this cutter mechanism 14 cuts the adhesive tape 152, 153 with print fed upon print formation as previously described. With this arrangement, the adhesive tape 152, 153 with print are cut based on preferred timing, making it possible for the user to remove and acquire the second roll R2, around which are wound the adhesive tape 152, 153 with print at a preferred length, from the front side of the housing 2.

Here, the attachment and detachment of the second roll R2 performed by pivoting the support bracket RB to the removal position as previously described are performed before winding work of the above described adhesive tape 152, 153 with print is newly performed (that is, in a state where tape feeding is stopped). That is, during that switching, the tape leading edge cut during the previous above described winding work is stopped at the position of the above described cutter mechanism 14. Correspondingly, according to this embodiment, an end of a connecting tape piece 46 is connected to the core member 45 (specifically, to the outer peripheral surface of the cylindrical part 45*c*, for example).

Then, in a case where the winding of the second roll R2 is to be newly performed, the user mounts the above described core member 45 to the support bracket RB and pivots the support bracket RB to the use position, and then adheres and connects the leading edge of the adhesive tape 152, 153 with print cut and generated as described above to the other end of the above described connecting tape piece 46 (to the end on the side opposite the side that connects to the core member 45). FIG. 17 shows the connected state of this connecting tape piece 46. With this arrangement, after adhering and connecting the connecting tape piece 46, it is possible to sequentially wind the adhesive tape 152, 153 with print to the outer peripheral side of the core member 45 (specifically, the cylindrical part 45*c*) and form the second roll R2 by pivoting the second opening/closing cover 4 to the closed position and thus rotating the core member 45 as previously described. As a result of the above, even in a case where the second roll R2 is to be newly generated, it is possible to smoothly and simply wind the adhesive tape 152, 153 with print.

Further, according to the core member 45 provided in this embodiment and shown in FIG. 20A, FIG. 20B, and FIG. 21, when the adhesive tape 152, 153 with print introduced from the introduction wall part 51 as described above are sequentially wound on the inner cylindrical surface 54, both width direction ends of the adhesive tape 152, 153 with print do not readily stick to anything by contact with the above described middle wall parts 52 and 52. Further, even if sticking were to occur, sticking to the introduction wall part 51 is peeled once again due to the subsequent rotation of the above described core member 45, making it possible to properly guide and affix the adhesive tape 152, 153 with print to the inner cylindrical surface 54. As a result, difficulties in take-up caused by the sticking of the adhesive layer 152 such as previously described no longer arise, making it possible to improve the take-up performance of the adhesive tape 152, 153 with print and execute take-up with high accuracy and high reliability. As a result, it is possible to reliably wind the adhesive tape 152, 153 with print and generate the second roll R2.

Further, in particular, according to this embodiment, when the adhesive tape 152, 153 with print are affixed to the inner cylindrical surface 54, they are affixed to the bottom surface of the concave groove 55 while introduced to the concave groove 55 provided to the inner cylindrical surface 54. With this arrangement, it is possible to position and guide the adhesive tape 152, 153 with print in the width direction even during introduction to the concave groove 55, making it possible to execute take-up with even higher accuracy.

Further, in particular, according to this embodiment, the size relationship between the above described axial direction dimensions w1, w2, and w3 of the above described introduction wall part 51, the middle wall part 52, and the inner cylindrical surface 54, respectively, is w3 (≈W)<w1 and w1<w2. With this arrangement, in the introduction wall part 51, it is possible to reliably introduce the adhesive tape 152, 153 with print based on a certain degree of width direction positioning accuracy using the dimension w1. Further, in the inner cylindrical surface 54, it is possible to affix the adhesive tape 152, 153 with print based on high positioning accuracy using the dimension w3.

Further, in the adhesive tape cartridge TK of this embodiment, when the user handles the adhesive tape cartridge TK as previously described, it is possible to adhere the above described adhesive tape 152, 153 with print (particularly, the leading edge and nearby area) to the above described release processing part 70 and the cover member 71, thereby preventing the tape leading edge and nearby area from mistakenly sticking to each location. Further, since the release processing is performed on the release processing part 70 and cover member 71 as previously described, in a case, for example, where the adhesive tape cartridge TK is mounted to the adhesive tape printer 1 and the print process is to be started, etc., the user can simply peel the adhesive tape 152, 153 with print from the release processing part 70 and the cover member 71, and then execute setup to a predetermined mode for the print process (for example, affix the other end of the aforementioned connecting tape piece 46, etc.). As a result of the above, in this embodiment, it is possible to improve the handling performance of the overall adhesive tape cartridge TK and improve user convenience.

Further, in particular, in this embodiment, either a release processing area is formed in a corresponding area of the connecting arm 21 or a release processing member is provided as a separate member to the connecting arm 21, as the release processing part 70. With this arrangement, even if a new member for adherence is not prepared separately from the connecting arm 21, it is possible for the user to separably adhere the adhesive tape 152, 153 with print.

Further, in particular, in this embodiment, the cover member 71 of the above described configuration is provided, making it possible to reliably prevent the above described adhesive layer 152 of the adhesive tape 152, 153 with print from mistakenly sticking to the third roll R3.

Further, in particular, in this embodiment, the cover member 71 comprises the hole 72 of the above described configuration. With this arrangement, when the user wants to once again peel the adhesive tape 152, 153 with print that were temporarily adhered to the cover member 71, the user can simply perform the peeling by a finger operation from the hole 72. As a result, it is possible to further improve user convenience.

Further, in this embodiment, as previously described, the user can freely select whether to acquire the adhesive tape 152, 153 with print, etc., wound into a roll shape as the second roll R2 or acquire the adhesive tape 150' with print in a tape-like shape as is via the discharging exit 12 by switching the shoot 15 in accordance with his or her preference (and setting whether or not the third roll R3 is to be made to function or not). As a result, it is possible to improve user convenience.

Further, in particular, according to this embodiment, in the above described regular feeding mode in which the shoot 15 is switched to the upper position, it is possible to peel the separation material layer 151 from the adhesive tape 150' with print and form the third roll R3 by making the third roll R3 function. As a result, the handling of the separation material layer 151 that will be discarded becomes more convenient, thereby making it possible to improve user convenience.

Further, in particular, according to this embodiment, when the shoot 15 is switched to the lower position, the leading edge position of the shoot 15 is configured to be closer to the side near the cutter mechanism 14 side. With this arrangement, when the tape leading edge of the adhesive tape 152, 153 with print, etc., that has been cut during the previous winding work (or discharging work) and stopped at the position of the cutter mechanism 14 is fed, the shoot 15 is capable of reliably seizing the tape leading edge of the adhesive tape 152, 153 with print, etc. As a result, it is possible to reliably guide the adhesive tape 152, 153 with print, etc., to the discharging exit 12 and reliably discharge them to outside the housing 2.

Note that while the above has described an illustrative scenario in which the adhesive tape 150' with print is formed using the print-receiving adhesive tape 150, which is an adherable tape, as the tape subject to feeding, the present disclosure is not limited thereto. That is, the aforementioned configuration may be applied to a case where print tape on which preferred print is formed, such as advertisement ribbon, for example, is formed using print-receiving tape that is not adhesive.

Other than those previously described, approaches according to each of the above embodiments may be utilized in combination as appropriate.

What is claimed is:

1. An adhesive tape cartridge comprising:

an adhesive tape roll around which is wound an adhesive tape comprising a separation material layer that has a tape-like-shape and extends along a longitudinal direction, an adhesive layer that is disposed on a first surface of said separation material layer, and a base layer that has a tape-like-shape and covers said adhesive layer a separation material roll a connecting arm that has a cross-sectional shape that is substantially U-shaped, a first edge, a second edge, and a first direction that extends from the first edge to the second edge, wherein on the connecting arm said adhesive tape roll is supported rotatably around a first axis line along a second direction orthogonal to said first direction, and on the connecting arm said separation material roll is supported rotatably around a second axis line along said second direction, wherein said connecting arm comprises a slit extending along said second direction, an configured so that said adhesive tape is fed to said slit after being fed out from said adhesive tape roll, wherein said separation material layer is peel off from said adhesive tape that has passed through said slit, and is wound on said separation material roll, said connecting arm further comprises:

a pair of first bracket parts that sandwich said adhesive tape roll from one side and another side along said first axis line and thus rotatably hold said adhesive tape roll provided proximal said second edge;

a first connecting part that extends and connects a part of said pair of first bracket parts;

a pair of second bracket parts that sandwich said separation material roll from one side and another side along said second axis line and thereby rotatably hold said separation material roll provided proximal said first edge;

a second connecting part that extends and connects a part of said pair of second bracket parts; wherein said pair of first bracket parts are spaced apart from said pair of second bracket parts; and a pair of roll connecting beam parts that connect said first bracket part and said first connecting part and said second bracket part and said second connecting part, and wherein the adhesive tape cartridge further comprises a guide device configured to cause said adhesive tape fed from said adhesive tape roll to pass in a tape posture with a tape cross-section set to said second direction, substantially contact both ends of said adhesive tape in said second direction during said passing, and to guide said adhesive tape in said second direction, provided to one side of said first connecting part of said connecting arm in a third direction that is orthogonal to both of said first direction and said second direction.

2. The adhesive tape cartridge according to claim 1, wherein:

said adhesive tape roll winds said adhesive tape so that a second surface of said separation material layer of said adhesive tape is disposed on an inner side, as viewed from said second direction of said separation material roll, said adhesive tape roll is supported by said connecting arm so that said adhesive tape is fed out from an outer peripheral part of the adhesive tape roll while rotating in a first rotating direction; and said separation material roll is supported by said connecting arm so that said separation material layer peeled by said slit is taken up at a take-up position of a roll outer peripheral part of the separation material roll and is in a posture that said second surface of said separation material is on outer side while rotating in a second rotating direction opposite to the first rotating direction.

3. An adhesive tape cartridge comprising:

a connecting arm;

an adhesive tape roll around which an adhesive tape is wound; and a separation material roll said connecting arm comprising:

a rear-left bracket having an upper end, a lower end an outer surface, and an inner surface;

a rear-right bracket having an upper end, a lower end, an outer surface and an inner surface;

a rear bracket connecting portion having an upper surface and a lower surface;

a front-left bracket having an upper end, a lower end, an outer surface, and an inner surface;

a front-right bracket having an upper end, a lower end, an outer surface, and an inner surface;

a front bracket connecting portion having an upper surface and a lower surface;

a slit a left beam having a front end and rear end; and a right beam having a front end and rear end;

said upper end of said rear-left bracket and said upper end of said rear-right bracket being connected to said rear bracket connecting portion, said rear-left bracket extending downwards from said rear bracket connecting portion, said right-rear bracket extending downwards from said rear bracket connecting portion, said rear-left bracket and said rear-right bracket facing each other along a left-right direction, said upper end of said front-left bracket and said upper end of said front-right bracket being connected to said front bracket connecting portion, said front-left bracket extending downwards from said front bracket connecting portion, said front-right bracket extending downwards from said front bracket connecting portion, said front-left bracket and said front-right bracket facing each other along a left-right direction, said slit being disposed on a front end of said upper surface of said front bracket connection portion and extending along said left-right direction, said rear end of said left beam being connected to said rear-left bracket, said front end of said left beam being connected to said front-left bracket, said rear end of said right beam being connected to said front-right bracket, said adhesive tape roll being sandwiched to be rotatably supported by said lower end of said rear-left bracket and said lower end of said rear-right bracket along said left-right direction, between said inner surface of said rear-left bracket and said inner surface of the said rear-right bracket, said separation material roll being sandwiched to be rotatably supported by said lower end of said front-left bracket and said lower end of said front-right bracket along said left-right direction, between said inner surface of said front-left bracket and said inner surface of said front-right bracket, wherein the front bracket portions are spaced apart from the rear bracket portions said adhesive tape including:

a separation material that has a tape-like-shape and extends along a longitudinal direction;

an adhesive layer that is disposed on an upper surface of said separation material, and a base layer that has a tape-like-shape and covers said adhesive layer, said adhesive tape being configured so that:

after said adhesive tape is fed out from said adhesive tape roll said adhesive tape passes under said rear bracket portion and passes between said left beam and said right beam and passes over said front bracket connecting portion, and then passes through said slit for said separation material to be peeled from said adhesive tape; and said separation material peeled through said slit being configured to be wound around an outer periphery of said separation material roll.

4. The adhesive tape cartridge according to claim 3, wherein:

said rear end of said left beam is connected to said outer surface of said rear-left bracket, said front end of said left beam is connected to said outer surface said front-left bracket, said rear end of said right beam is connected to said outer surface of said rear-right bracket, and said front end of said right beam is connected said outer surface of said front-right bracket.

5. The adhesive tape cartridge according to claim 3, wherein:

a left guide portion and a right guide portion provided on said lower surface of said rear bracket connecting portion, said left guide portion protrudes downwards from said rear bracket connecting portion, said right guide portion protrudes downwards from said rear bracket connecting portion, said left guide portion and said right guide portion space each other along said left-right direction, and said adhesive tape being configured so that:

after said adhesive tape is fed out from said adhesive tape roll, said adhesive tape passes under said rear bracket connecting portion and passes between said left guide portion and said right guide portion and passes between said left beam and said right beam and passes over said front bracket connecting portion, and then passes through said slit for said separation material to be peeled from said adhesive tape.

6. The adhesive tape cartridge according to claim 3, wherein:

a rear-left hole is provided to said lower end of said rear-left bracket, a rear-right hole is provided to said lower end of said rear-right bracket, a front-left hole is provided to said lower end of said front-left bracket, a front-right hole is provided to said lower end of said front-right bracket, said adhesive tape roll is rotatably supported by said rear-left hole and said rear-right hole, said separation material roll is rotatably supported by said front-left hole and said front-right hole.

* * * * *